US009374413B2

(12) United States Patent
Tanaka et al.

(10) Patent No.: US 9,374,413 B2
(45) Date of Patent: Jun. 21, 2016

(54) CLIENT TERMINAL, SERVER, AND DISTRIBUTED PROCESSING METHOD

(71) Applicant: Panasonic Corporation, Osaka (JP)

(72) Inventors: Keiichi Tanaka, Osaka (JP); Hidetaka Oto, Osaka (JP); Tomonori Nakamura, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 224 days.

(21) Appl. No.: 14/080,026

(22) Filed: Nov. 14, 2013

(65) Prior Publication Data

US 2014/0143313 A1 May 22, 2014

(30) Foreign Application Priority Data

Nov. 22, 2012 (JP) .................................. 2012-256365

(51) Int. Cl.
*G06F 15/16* (2006.01)
*H04L 29/08* (2006.01)
*G06F 9/00* (2006.01)

(52) U.S. Cl.
CPC ........ *H04L 67/08* (2013.01); *G06F 9/00* (2013.01); *H04L 67/04* (2013.01); *H04L 67/10* (2013.01)

(58) Field of Classification Search
USPC .................................................. 709/203, 224
See application file for complete search history.

(56) References Cited

U.S. PATENT DOCUMENTS

2007/0130600 A1* 6/2007 Yanai ............... G08B 13/19676
725/105
2011/0258339 A1  10/2011 Matsui et al.

FOREIGN PATENT DOCUMENTS

JP         2012-15868        1/2012

OTHER PUBLICATIONS

"Execution speed of HTML5 by i-phone is one-sixth of that of PC, execution speed by Android is further slower", May 25, 2012 along with English translation.

* cited by examiner

*Primary Examiner* — Philip B Tran
(74) *Attorney, Agent, or Firm* — Wenderoth, Lind & Ponack, L.L.P.

(57) ABSTRACT

If an execution target application is an application with a high load for a client terminal, a mode switching unit switches an execution system from a simplex processing mode to a distributed processing mode. On the other hand, upon receiving a switching notification for switching the execution system to the simplex processing mode from a server, the mode switching unit causes a distributed display processing unit to stop display processing for the application and sets the execution system of the application to the simplex processing mode.

19 Claims, 18 Drawing Sheets

FIG. 8

RECORDED LOAD INFORMATION

| APPLICATION ID | CPU USE RATIO | MEMORY CONSUMPTION AMOUNT | FRAME RATE |
|---|---|---|---|
| appid:abc012 | 20% | 10% | 60fps |
| appid:def345 | 90% | 80% | 5fps |
| url:aaa.bbb.ccc/abc/012 | 70% | 30% | 20fps |
| url:xxx.yyy.zzz/xyz/345 | 40% | 20% | 3fps |

CLIENT TERMINAL, SERVER, AND DISTRIBUTED PROCESSING METHOD

BACKGROUND OF THE INVENTION AND RELATED ART STATEMENT

1. Field of the Invention

The present invention relates to a distributed processing technique in which a server and a client terminal perform processing in cooperation with each other to efficiently execute processing for various applications.

2. Description of the Related Art

Japanese Unexamined Patent Publication No. 2012-15868 discloses a below-mentioned technique for the purpose of reducing a data amount of a processing result transmitted from a server to a thin client system. The system includes a first transmitting unit configured to transmit an image to a terminal apparatus and a second transmitting unit configured to extract, from the image, a region where a change between frames exceeds a threshold, compress the image of the extracted region at a frame rate higher than a frame rate of the first transmitting unit, and transmit the image. The image transmitted by the first transmitting unit and the image transmitted by the second transmitted unit are displayed in synchronization with each other.

However, in Japanese Unexamined Patent Publication No. 2012-15868, since communication is generated every time a screen is updated, for example, when operation for scrolling an image is frequently input by a user, an enormous data amount is communicated and the power consumption of the client terminal increases. In particular, if the client terminal is a mobile terminal (e.g., a tablet terminal) rather than a stationary apparatus, since a battery capacity is limited, when an enormous data amount is communicated, a battery is exhausted soon.

SUMMARY OF THE INVENTION

It is an object of the prevent invention to provide a technique of distributed processing capable of smoothly executing an application simultaneously with suppressing power consumption in a client terminal.

A client terminal according to an aspect of the present invention is a client terminal that executes an application in cooperation with a server communicably connected to the client terminal via a network. The client terminal includes: a display unit configured to display image data, which is an execution result of the application; a mode switching unit configured to switch an execution system for the application to a simplex processing mode for causing the client terminal to execute the application and a distributed processing mode for causing the server to execute the application; an application executing unit configured to execute the application in the simplex processing mode; and a distributed display processing unit configured to receive the image data indicating the execution result of the application from the server and display the image data on the display unit in the distributed processing mode. The mode switching unit switches the execution system to the distributed processing mode if the application is an application with a high load for the client terminal.

With this configuration, it is possible to smoothly execute the application simultaneously with suppressing power consumption in the client terminal.

BRIEF DESCRIPTION OF THE DRAWINGS

FIG. 8 is a diagram showing an example of a data configuration of recorded load information in which load information recorded in a memory is collected;

DETAILED DESCRIPTION OF THE INVENTION (How the Inventor has Devised a Distributed Processing System According to Embodiments)

There is known a remote desktop technique in which a server executes an application and transmits image data indicating an execution result of the application to a client terminal according to an operation request from the client terminal and the client terminal displays the image data. With the remote desktop technique, a user can operate the server present on a network using the client terminal at hand.

However, in the remote desktop technique, when enormous image data is transmitted from the server to the client terminal, it is likely that a transmission delay of a processing result occurs and gives stress to the user.

On the other hand, it is also conceivable to execute all applications on a mobile terminal in order to avoid communication between the server and the client terminal. However, since a mobile terminal is limited in the performance of a CPU because of a problem of heat generation, the mobile terminal cannot execute an application as fast as the server. Therefore, the mobile terminal cannot cause a high-load application to smoothly operate.

Therefore, it is an object of embodiments to provide a distributed processing system capable of smoothly executing an application simultaneously with reducing a data amount communicated between a client terminal and a server and suppressing power consumption in the client terminal. The embodiments are explained in detail below.

(First Embodiment)

Figure 1:
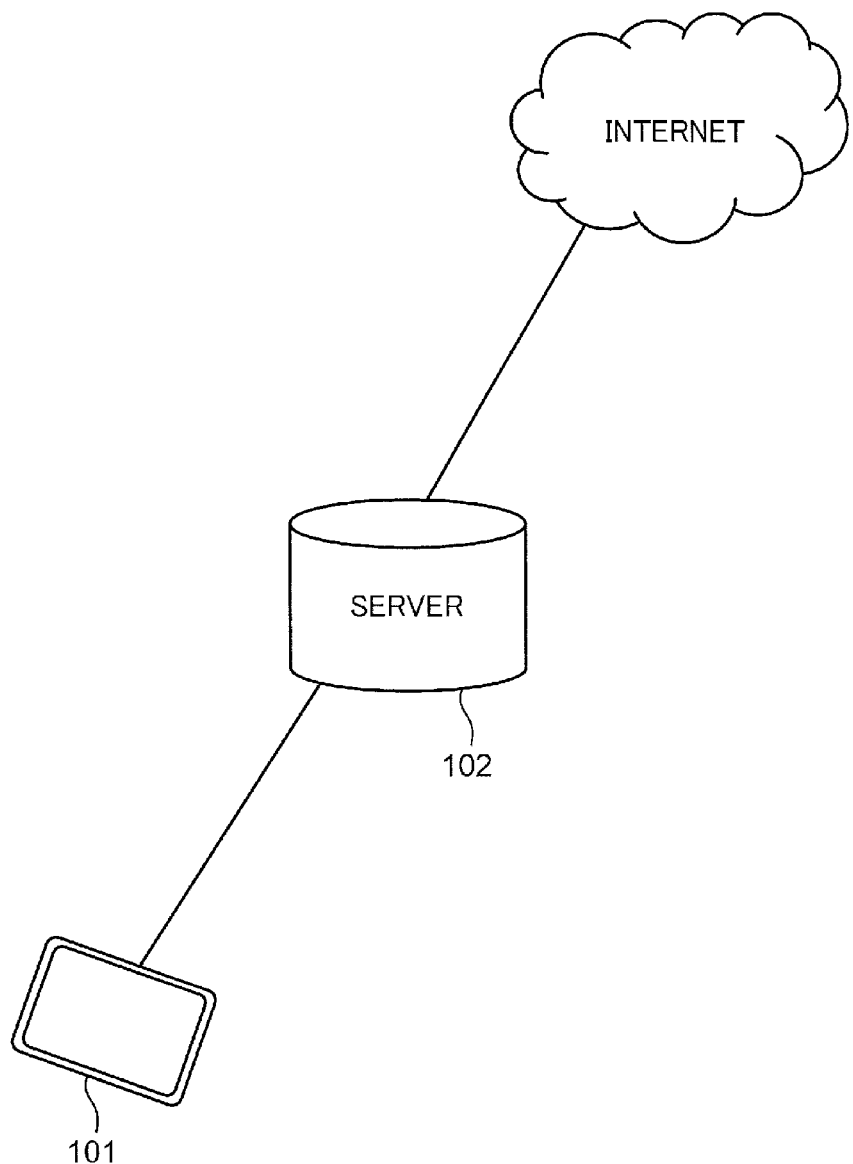
FIG. 1 is a diagram showing an example of a use form of a client terminal and a server in a first embodiment of the present invention.

FIG. 1 is a diagram showing an example of a use form of a client terminal 101 and a server 102 applied to a distributed processing system in a first embodiment of the present invention. The client terminal 101 is configured by a portable terminal with a display such as a table terminal, a smart phone, or a notebook PC. For example, a household electrical appliance (e.g., a refrigerator, a washing machine, or a microwave) having a communication function and mounted with a display may be regarded as the client terminal 101. The server 102 is a server that mediates various World Wide Web (WEB) services and WEB applications (hereinafter simply referred to as applications) on the Internet. The client terminal 101 executes the WEB services and the applications on the Internet via the server 102.

Figure 2A:
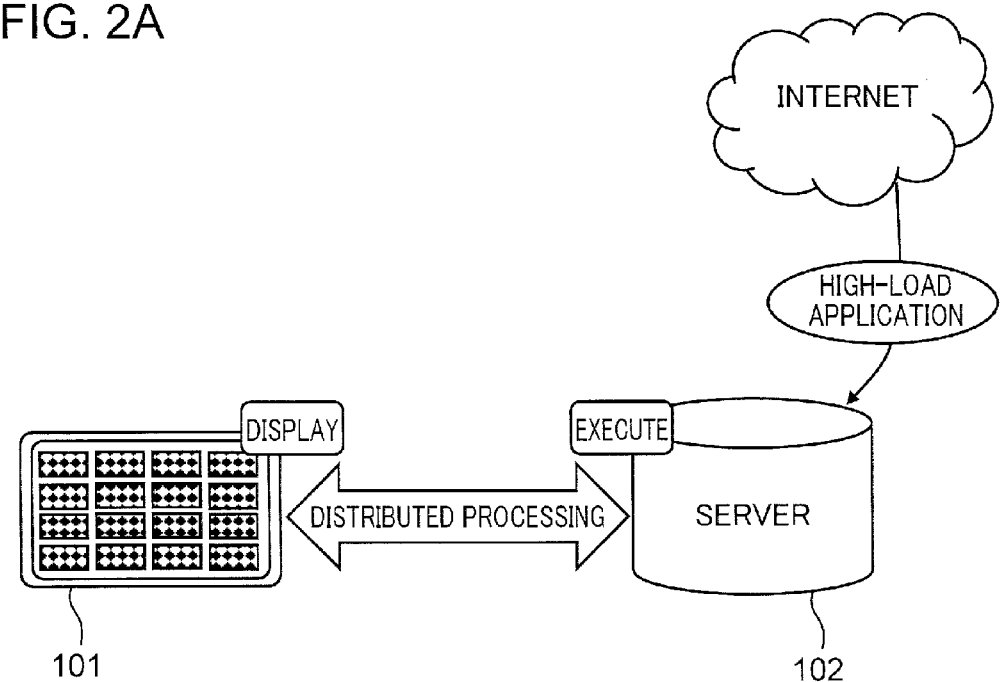
FIG. 2A is a diagram showing an example of a state in which an application is executed in a distributed processing mode.
Figure 2B:
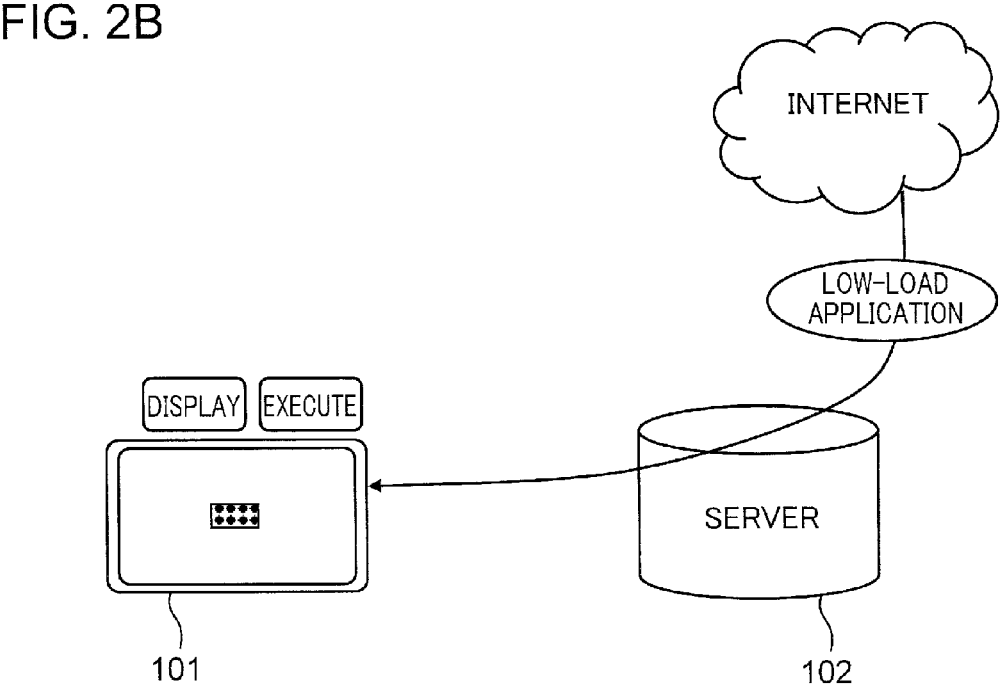
FIG. 2B is a diagram showing an example of a state in which an application is executed in a simplex processing mode.

FIGS. 2A and 2B are diagrams showing examples of states in which the client terminal 101 and the server 102 execute applications in cooperation with each other. An execution entity of an application is different depending on the load of the application.

FIG. 2A is a diagram showing an example of a state in which an application is executed in a distributed processing mode. In FIG. 2A, the client terminal 101 and the server 102 execute a high-load application in cooperation with each other. Examples of the high-load application include an application of three-dimensional computer graphics in which rendering is often used and an application for simultaneously reproducing a plurality of moving images.

If an application has a high load, the application is executed by the server 102. The client terminal 101 receives image data indicating an execution result of the application from the server 102 and displays the image data on a display unit. In this case, the client terminal 101 does not need to perform parsing and loading of the application and functions as a display terminal that simply displays the image data transmitted from the server 102.

FIG. 2B is a diagram showing an example of a state in which an application is executed in a simplex processing mode. In FIG. 2B, a low-load application is executed. Examples of the low-load application include an application for displaying only a text and a still image and an application for not simultaneously reproducing two or more moving images.

If an application has a low load, the application is executed by the client terminal 101. In this case, the client terminal 101 needs to perform parsing and loading of the application and displays an image indicating an execution result of the application executed by the client terminal 101 itself on the display unit. On the other hand, the server 102 does not execute the application and functions as a transfer server that simply transfers the application to the client terminal 101. In this embodiment, applications described in markup languages such as HTML5 and JAVASCRIPT (registered trademark) are adopted.

Figure 3:
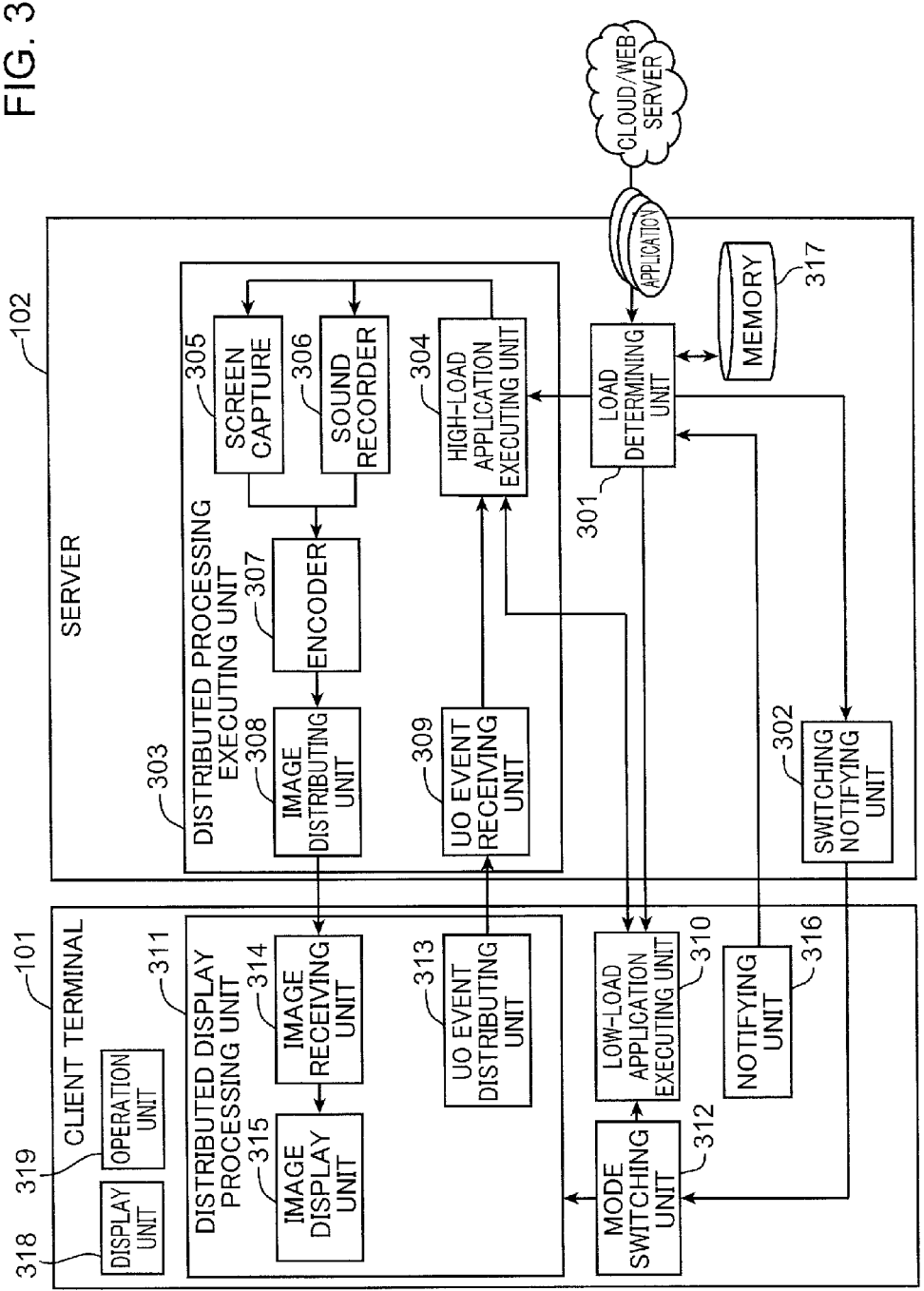
FIG. 3 is a block diagram showing an example of functional configurations of the client terminal and the server in the first embodiment.

FIG. 3 is a block diagram showing an example of functional configurations of the client terminal 101 and the server 102 in the first embodiment. As shown in FIG. 3, the client terminal 101 includes a distributed display processing unit 311, a low-load application executing unit 310 (an example of an application executing unit), a mode switching unit 312, a notifying unit 316, a display unit 318, and an operation unit 319.

The distributed display processing unit 311 includes a function of receiving image data indicating an execution result of an application from the server 102 and displaying the image data on the display unit 318 in the distributed processing mode and a function of notifying the server 102 of operation applied to the client terminal 101 by the user in the distributed processing mode. Specifically, the distributed display processing unit 311 includes an image receiving unit 314, an image display unit 315, and a UO (user operation) event distributing unit 313.

The image receiving unit 314 receives the image data transmitted from the server 102 as the execution result and decodes the received image data. Examples of a format of the image data transmitted from the server 102 include a format of an uncompressed image and a format of a compressed image. Examples of the format of the uncompressed image include a bitmap format. Examples of the format of the compressed image include a format configured by continuous image data, each of frames of which is compressed (e.g., a MotionJPEG format) and a format of moving image data configured by data compressed between frames (e.g., an H.264 format). Therefore, the image receiving unit 314 only has to decode the image data in a decode system corresponding to the format of the image data transmitted from the server 102.

If sound data is included in the execution result transmitted from the server 102, the image receiving unit 314 further decodes the sound data. Examples of a format of the sound data transmitted from the server 102 include a format of uncompressed sound data (e.g., a pulse code modulation (PCM) format) and a format of compressed sound data (e.g., an advanced audio coding (AAC) format). Therefore, the image receiving unit 314 only has to decode the sound data in a decode system corresponding to the format of the transmitted sound data. If the client terminal 101 does not include a speaker or if sound data is not included in the execution result transmitted from the server 102, the image receiving unit 314 only has to skip processing for decoding sound data.

The image display unit 315 writes the image data decoded by the image receiving unit 314 in a frame buffer (not shown in the figures) and displays the image data on the display unit 318. When sound data is included in the execution result, the image display unit 315 causes a speaker (not shown in the figures) to output sound indicated by the image data decoded by the image receiving unit 314.

The UO event distributing unit 313 detects user operation for an application input by the user operating the operation unit 319 and transmits a UO event indicating content of the detected user operation to the server 102. Examples of the user operation include a touch on a screen, a click of a mouse, and pressing operation for a key of a keyboard.

For example, when the user operation is the touch or the click, the UO event distributing unit 313 transmits a UO event including a touched or clicked coordinate on a screen to the server 102. When the user operation is the key operation, the UO event distributing unit 313 transmits a UO event indicating a pressed key to the server 102. The server 102 advances processing of the application on the basis of the user operation indicated by the UO event transmitted from the UO event distributing unit 313.

The low-load application executing unit 310 is configured by an application execution engine such as an HTML browser. The low-load application executing unit 310 acquires an application, parses the acquired application, and executes the application in the simplex processing mode. The execution target application is present on a cloud or a WEB server. The low-load application executing unit 310 downloads and acquires the application.

The low-load application executing unit 310 downloads the application through the server 102 rather than downloading the application directly from the cloud or the WEB server. Since the application is downloaded through the server 102, the server 102 determines whether the load of the application is high or low for the client terminal 101. If the server 102 determines that the load of the application is low for the client terminal 101, data of the application is transmitted to the low-load application executing unit 310 and the application is executed by the low-load application executing unit 310. On the other hand, if the server 102 determines that the load of the application is high for the client terminal 101, the data of the application is not transmitted to the low-load application executing unit 310. In this case, a switching notification for switching an execution system to the distributed processing mode is transmitted from the server 102 to the mode switching unit 312, the distributed display processing unit 311 is started, and the application is executed in the distributed processing mode.

If an execution target execution target application is an application with a high load for the client terminal 101, the mode switching unit 312 switches the execution system from the simplex processing mode to the distributed processing mode. The mode switching unit 312 receives the switching notification of the execution system from the server 102 and performs switching of the distributed processing mode and the simplex processing mode according to content indicated by the switching notification.

The distributed processing mode is a mode in which execution processing for an application is allocated to the server 102 and display processing for the application is allocated to the client terminal 101. In the distributed processing mode, apparatuses that perform the execution processing and the display processing are distributed. A plurality of apparatuses process the application while cooperating with one another.

The simplex processing mode is a mode in which both of the execution processing and the display processing are allocated to one apparatus. In the simplex processing mode, the one apparatus alone processes the application.

Upon receiving the switching notification for switching the execution system to the distributed processing mode from the server 102, the mode switching unit 312 causes the low-load application executing unit 310 to stop the execution processing for the application and causes the low-load application executing unit 310 to transmit execution state information indicating a present execution state of the application to the server 102. The mode switching unit 312 starts the distributed display processing unit 311 and switches the execution system for the application to the distributed processing mode.

On the other hand, upon receiving the switching notification for switching the execution system to the simplex processing mode from the server 102, the mode switching unit 312 causes the distributed display processing unit 311 to stop the display processing for the application. The mode switching unit 312 transfers the present execution state of the application to the low-load application executing unit 310 from the execution state information transmitted from the server 102 and sets the execution system for the application to the simplex processing mode.

The transfer of the execution state of the application is performed when the execution state information is transmitted and received between the low-load application executing unit 310 and a high-load application executing unit 304. Examples of the execution state information include information indicating a storage destination of the application being executed (e.g., uniform resource locator (URL)), information indicating the present execution state of the application (e.g., HTTPCookie), and storage data concerning the application.

The notifying unit 316 notifies the high-load application executing unit 304 of terminal information necessary for a load determining unit 301 to determine whether the load of the application is high. The terminal information includes performance information and load information. The performance information is static information indicating the performance of the client terminal 101. The performance information includes, for example, a version of an operating system (OS) used by the client terminal 101, the number of clocks of a CPU of the client terminal 101, and the capacity of a memory mounted on the client terminal 101. The load information is information indicating the load of the client terminal 101 that dynamically changes. The load information includes, for example, the present CPU use ratio, the present memory consumption amount, and the present rendering frame rate.

The display unit 318 is configured by a display device such as a liquid crystal panel or an organic EL panel. The display unit 318 displays image data, which is an execution result of an application. Specifically, the display unit 318 displays image data received by the distributed display processing unit 311 in the distributed processing mode and displays image data, which is an execution result of the application by low-load application executing unit 310, in the simplex processing mode.

The operation unit 319 is configured by operation devices such as a touch panel, a keyboard, and a mouse. The operation unit 319 receives user operation.

The functional configuration of the client terminal 101 is as explained above.

The server 102 includes the load determining unit 301, a switching notifying unit 302, a distributed processing executing unit 303, and a memory 317. The distributed processing executing unit 303 includes a high-load application executing unit 304 (an example of a server-side application executing unit), a screen capture 305, a sound recorder 306, an encoder 307, an image distributing unit 308, and a UO event receiving unit 309.

The load determining unit 301 determines whether an execution target application is an application with a high load or an application with a low load for the client terminal 101.

The load determining unit 301 determines whether the load is high on the basis of terminal information notified from the notifying unit 316 and application information specified by the application.

Specifically, if performance information included in the terminal information satisfies performance conditions included in the application information, the load determining unit 301 determines that the execution target application is the application with a low load for the client terminal 101. If the performance information does not satisfy the performance conditions, the load determining unit 301 determines that the execution target application is the application with a high load for the client terminal 101. When determining that the execution target application is the high-load application, the load determining unit 301 transmits a switching notification for switching the execution system to the distributed processing mode to the mode switching unit 312 via the switching notifying unit 302. When determining that the execution target application is the low-load application, the load determining unit 301 transmits a switching notification for switching the execution system to the simplex processing mode to the mode switching unit 312 via the switching notifying unit 302.

The load determining unit 301 monitors the load of the client terminal 101 in the simplex processing mode. If the load exceeds a specified value, the load determining unit 301 transmits a switching notification for switching the execution system to the distributed processing mode to the mode switching unit 312 via the switching notifying unit 302. The load determining unit 301 only has to receive load information periodically transmitted from the notifying unit 316 to monitor the load of the client terminal 101. The notifying unit 316 only has to acquire load information from the OS of the client terminal 101.

Performance conditions are not specified for some application. In this case, first, the load determining unit 301 transmits a switching notification for switching the execution system to the simplex processing mode to the mode switching unit 312 via the switching notifying unit 302 and sets the execution system to the simplex processing mode in advance. The load determining unit 301 monitors the load of the client terminal 101. If the load exceeds the specified value, the load determining unit 301 only has to transmit a switching notification for switching the execution system to the distributed processing mode to the mode switching unit 312 via the switching notifying unit 302.

The load determining unit 301 records a monitoring result of the load of the execution target application in the memory 317 in advance. During a start of an application, the load determining unit 301 refers to the memory 317 and, if a monitoring result indicating a high load is recorded as a monitoring result of a relevant application, determines that the relevant application is a high-load application. The load determining unit 301 only has to transmit a switching notification for switching the execution system to the distributed processing mode to the mode switching unit 312 via the switching notifying unit 302.

On the other hand, when the execution target application is executed by the client terminal 101 for the first time, a monitoring result is not recorded in the memory 317. In this case, first, the load determining unit 301 transmits a switching notification for switching the execution system to the simplex processing mode to the mode switching unit 312 via the switching notifying unit 302 and sets the execution system to the simplex processing mode in advance. The load determining unit 301 monitors the load of the client terminal 101. If the load exceeds the specified value, the load determining unit 301 only has to transmit a switching notification for switching the execution system to the distributed processing mode to the mode switching unit 312 via the switching notifying unit 302.

If the load determining unit 301 determines that the execution target application is a high-load application, the switching notifying unit 302 transmits a switching notification for switching the execution system to the distributed processing mode to the mode switching unit 312. On the other hand, if the load determining unit 301 determines that the execution target application is a low-load application, the switching notifying unit 302 transmits a switching notification for switching the execution system to the simplex processing mode to the mode switching unit 312.

The high-load application executing unit 304 is configured by an application execution engine such as an HTML browser. If the load determining unit 301 determines that the execution target application is a high-load application, the high-load application executing unit 304 parses the application and executes the application.

A basic function of the high-load application executing unit 304 is the same as the basic function of the low-load application executing unit 310. However, in general, the server 102 has higher performance of a CPU, a memory, and the like compared with the client terminal 101. Therefore, the high-load application executing unit 304 can execute a high-load application.

The screen capture 305 captures, in an encode buffer (not shown in the figures), image data written in a graphic memory (not shown in the figures) by the high-load application executing unit 304 executing the application.

Usually, rendered image data written in the graphic memory is output to a display device directly connected to an apparatus that has performed processing. However, in this embodiment, the image data is displayed on the display unit 318 of the client terminal 101 present in a remote location. Therefore, the screen capture 305 captures the image data in the encode buffer (not shown in the figures) in order to cause the encoder 307 to encode the image data. It is preferable to set a capture interval for image data short because an animation or a moving image displayed in the client terminal 101 is smoother as the capture interval is shorter. However, it is not preferable to set the capture interval excessively short because a data amount of image data transmitted to the client terminal 101 increases. Therefore, the capture interval is preferably about 60 fps as long as there is room in the performance of the server 102.

The sound recorder 306 captures, in the encode buffer (not shown in the figures), sound data written in a sound memory (not shown in the figures) by the high-load application executing unit 304 executing the application.

Usually, sound data written in the sound memory is output to a speaker directly connected to an apparatus that has performed processing. However, in this embodiment, the sound data is output from a speaker of the client terminal 101 present in a remote location. Therefore, the sound recorder 306 captures the sound data on the sound memory in the encode buffer (not shown in the figures) in order to cause the encoder 307 to encode the sound data. If the client terminal 101 does not include a speaker or if the execution target application does not output sound, the capturing and the encoding of the sound data may be omitted. In this case, only the image data is transmitted to the client terminal 101.

The encoder 307 encodes the image data captured by the screen capture 305 and the sound data captured by the sound recorder 306. If the image data and the sound data are transmitted to the client terminal 101 while being kept uncompressed without being encoded, an enormous data amount is transmitted to the client terminal 101 and a network load increases. Therefore, the encoder 307 only has to encode the image data and the sound data to set a bit rate allowed by a network between the client terminal 101 and the server 102.

The image distributing unit 308 transmits the image data and the sound data encoded by the encoder 307 to the client terminal 101. As a communication protocol used in transmitting the image data and the sound data, it is preferable to use UDP rather than TCP in order to reduce a delay as much as possible.

The UO event receiving unit 309 receives a UO event transmitted from the client terminal 101 and notifies the high-load application executing unit 304 of the UO event. The high-load application executing unit 304 passes the UO event notified from the UO event receiving unit 309 to the application being executed and causes the application to perform processing corresponding to the UO event. The application being executed by the high-load application executing unit 304 behaves as if the application is operated by the touch panel, the mouse, the keyboard, or the like connected to the server 102. However, actually, the application is operated by the operation unit 319 of the client terminal 101 present in a remote location.

For example, when the user presses an enter key of the operation unit 319, a UO event indicating that the enter key is pressed is notified from the UO event distributing unit 313 to the UO event receiving unit 309. The UO event receiving unit 309 notifies the high-load application executing unit 304 of the UO event. The high-load application executing unit 304 notifies the application being executed of the UO event.

Consequently, although, for example, the enter key of the operation unit 319 present in a remote location is pressed, the application behaves as if an enter key of a keyboard directly connected to the server 102 is pressed. That is, the behavior of the application is not different in the simplex processing mode and the distributed processing mode. The user can operate the application without being aware of a difference between the simplex processing mode and the distributed processing mode.

Figure 18:
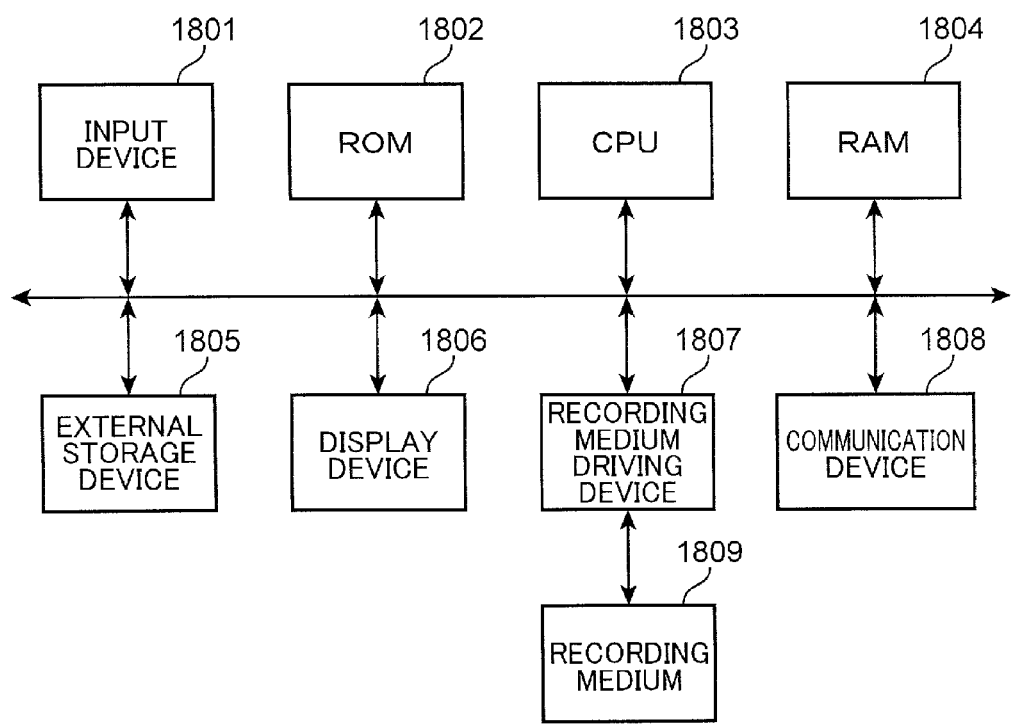
FIG. 18 is a diagram showing an example of a hardware configuration of a computer that realizes each of the client terminal and the server.

In FIG. 3, the distributed display processing unit 311, the low-load application executing unit 310, the mode switching unit 312, and the notifying unit 316 are configured by a communication device 1808 (see FIG. 18) and storage devices (a ROM 1802, a RAM 1804, an external storage device 1805, and the like shown in FIG. 18) configured to store a computer program for controlling the communication device 1808. The distributed display processing unit 311, the low-load application executing unit 310, the mode switching unit 312, and the notifying unit 316 are realized by a CPU 1803 (see FIG. 18) of the client terminal 101 executing the computer program. The computer program configures a client program for causing a computer to function as the client terminal 101. The computer program is recorded on a computer-readable recording medium and provided to the user. Alternatively, the client program may be downloaded from a download server provided on the Internet and provided to the user. The distributed display processing unit 311, the low-load application executing unit 310, the mode switching unit 312, and the notifying unit 316 may be configured by dedicated hardware circuits. In this case, the distributed display processing unit 311, the low-load application executing unit 310, the mode switching unit 312, and the notifying unit 316 may be formed as one chip and configured by an integrated circuit.

In FIG. 3, the distributed processing executing unit 303, the load determining unit 301, and the switching notifying unit 302 are configured to a communication device 1808 (see FIG. 18) and storage devices (the ROM 1802, the RAM 1804, the external storage device 1805, and the like shown in FIG. 18) configured to store a computer program for controlling the communication device 1808. The distributed processing executing unit 303, the load determining unit 301, and the switching notifying unit 302 are realized by the CPU 1803 (see FIG. 18) of the server 102 executing the computer program. The computer program configures a server program for causing a computer to function as the server 102. The computer program is recorded on a computer-readable storage medium and provided to the user. Alternatively, the server program may be downloaded from a download server provided on the Internet and provided to the user.

The distributed processing executing unit 303, the load determining unit 301, and the switching notifying unit 302 may be configured by dedicated hardware circuits. In this case, the distributed processing executing unit 303, the load determining unit 301, and the switching notifying unit 302 may be formed as one chip and configured by an integrated circuit. The memory 317 is configured by a rewritable nonvolatile storage device such as a hard disk drive or an FERAM.

In FIG. 3, the UO event distributing unit 313 may be omitted. In this case, the high-load application executing unit 304 only has to directly receive a UO event. The notifying unit 316 may be omitted. In this case, the low-load application executing unit 310, the distributed display processing unit 311, or the mode switching unit 312 only has to transmit data to the load determining unit 301. If the sound data and the image data are not compressed, the encoder 307, the screen capture 305, and the sound recorder 306 may be omitted. The image distributing unit 308 may be omitted. In this case, the high-load application executing unit 304 only has to transmit an execution result to the client terminal 101. The switching notifying unit 302 may be omitted. In this case, the load determining unit 301 only has to directly transmit a switching notification.

Figure 4:
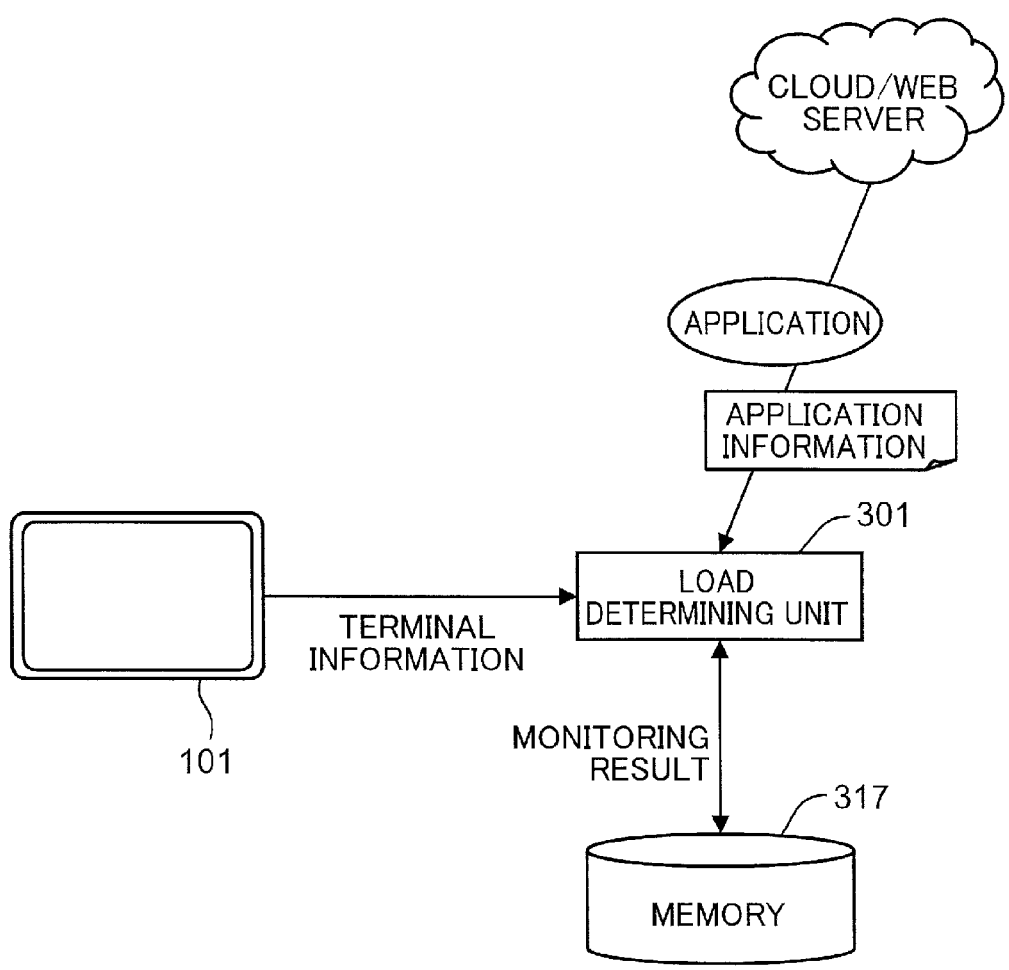
FIG. 4 is an explanatory diagram of an overview of determination processing by a load determining unit.

FIG. 4 is an explanatory diagram of an overview of determination processing by the load determining unit 301. The load determining unit 301 determines whether an execution target application is an application with a high load for the client terminal 101 on the basis of terminal information obtained from the client terminal 101, application information incidental to the execution target application, and a monitoring result of the load of the client terminal 101 obtained when the same application was executed in the past.

Figure 5:
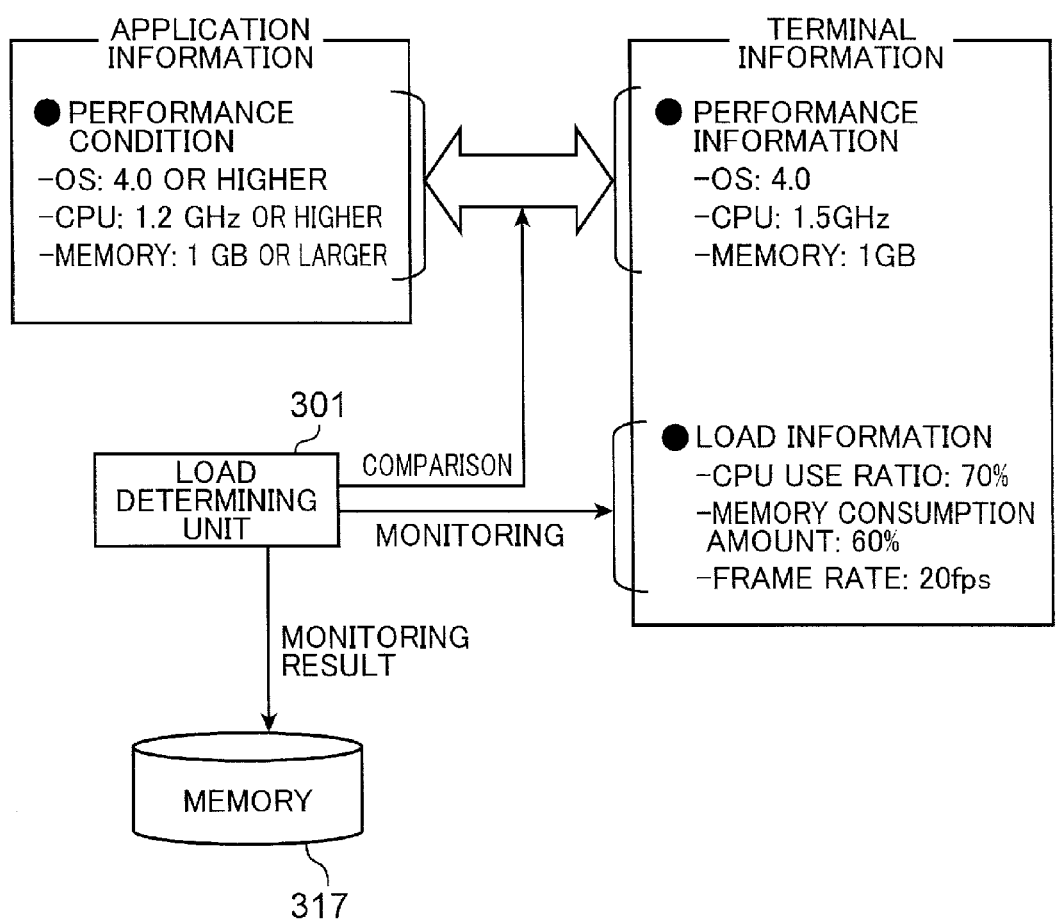
FIG. 5 is an explanatory diagram of details of the determination processing by the load determining unit.

FIG. 5 is an explanatory diagram of details of the determination processing by the load determining unit 301. The application information includes performance conditions indicating the performance of the client terminal 101 necessary for executing the execution target application. Examples of the performance conditions include the version of the OS, the number of clocks of the CPU, and the memory capacity.

On the other hand, the terminal information includes performance information and load information. The performance information includes the version of the OS, the number of clocks of the CPU, and the memory capacity of the client terminal 101. The load information includes information that changes dynamically such as the present CPU use ratio, the present memory consumption amount, and the present frame rate. The performance information is always fixed. However, values of the load information change at every moment.

First, the load determining unit 301 compares the performance conditions included in the application information and the performance information included in the acquired terminal information and determines whether the performance information of the client terminal 101 satisfies the performance conditions of the execution target application.

In an example shown in FIG. 5, as the performance conditions, for example, it is specified that the version of the OS is equal to or higher than 4.0, the number of clocks of the CPU is equal to or higher than 1.2 GHz, and the memory capacity is equal to or larger than 1 GB. On the other hand, the performance information indicates that the version of the OS is 4.0, the number of clocks of the CPU is 1.5 GHz, and the memory capacity is 1 GB. Therefore, since the performance information satisfies all the items of the performance conditions, the load determining unit 301 determines that the client terminal 101 satisfies the performance conditions. The load determining unit 301 may determine that the client terminal 101 satisfies the performance conditions if the performance information satisfies any one or a plurality of items of the performance conditions even if the performance information does not satisfy all the items of the performance condition. As the performance conditions, the items shown in FIG. 5 are only an example. Other items may be adopted or any one of the items shown in FIG. 5 may be omitted.

If the client terminal 101 satisfies performance conditions of the application, the application is started in the simplex processing mode. If the client terminal 101 does not satisfy the performance conditions of the application, the application is started in the distributed processing mode.

When the application is started in the simplex processing mode, the load determining unit 301 periodically acquires load information of the client terminal 101 and monitors whether there is room in the load of the client terminal 101.

In the example shown in FIG. 5, a CPU use ratio, a memory consumption amount, and a frame rate are adopted as the load information. Therefore, if the CPU use ratio, the memory consumption amount, and the frame rate exceed specified values, the load determining unit 301 only has to determine that the execution target application is an application with a high load for the client terminal 101.

As the specified values, numerical values at which the client terminal 101 cannot smoothly process the application when the application is started in the simplex processing mode can be adopted. For example, as the CPU use ratio and the memory consumption amount, numerical values indicating a high load such as 90% are adopted. In this case, if the CPU use ratio or the memory consumption amount exceeds, for example, 90%, the load determining unit 301 may determine that the load of the client terminal 101 exceeds the specified value. In the example shown in FIG. 5, the present CPU use ratio of the client terminal 101 is 70%, which is lower than the specified value 90%. Therefore, the load determining unit 301 determines that the load does not exceed the specified value.

The frame rate included in the load information is a numerical value indicating how many image data the client terminal 101 can render in a unit time at present. Therefore, as the numerical value is larger, the frame rate indicates that there is more room in the load of the client terminal 101. Therefore, concerning the frame rate, if the frame rate included in the load information is equal to or smaller than the specified value, the load determining unit 301 only has to determine that the load of the client terminal 101 exceeds the specified value.

If all the items included in the load information exceed the specified values, the load determining unit 301 may determine that the execution target application has a high load. If any one or a plurality of items included in the load information exceed the specified values, the load determining unit 301 may determine that the execution target application has a high load. In FIG. 5, the CPU use ratio, the memory consumption amount, and the frame rate are shown as the load information. However, these items are only an example. Other items may be adopted or a part of the items may be omitted.

As shown in FIG. 5, the load determining unit 301 records the load information of the client terminal 101 in the memory 317. The load information recorded in the memory 317 is referred to by the load determining unit 301 when the same application is started next time. For example, it is assumed that, when an execution target application is started, a CPU ratio equal to or higher than the specified value (90%) is set in the memory 317 as a CPU use ratio of a relevant application. In this case, even if the performance information of the client terminal 101 satisfies the performance conditions, the load determining unit 301 determines that the relevant application is an application with a high load for the client terminal 101 and starts the relevant application in the distributed processing mode from the beginning.

Figure 6:
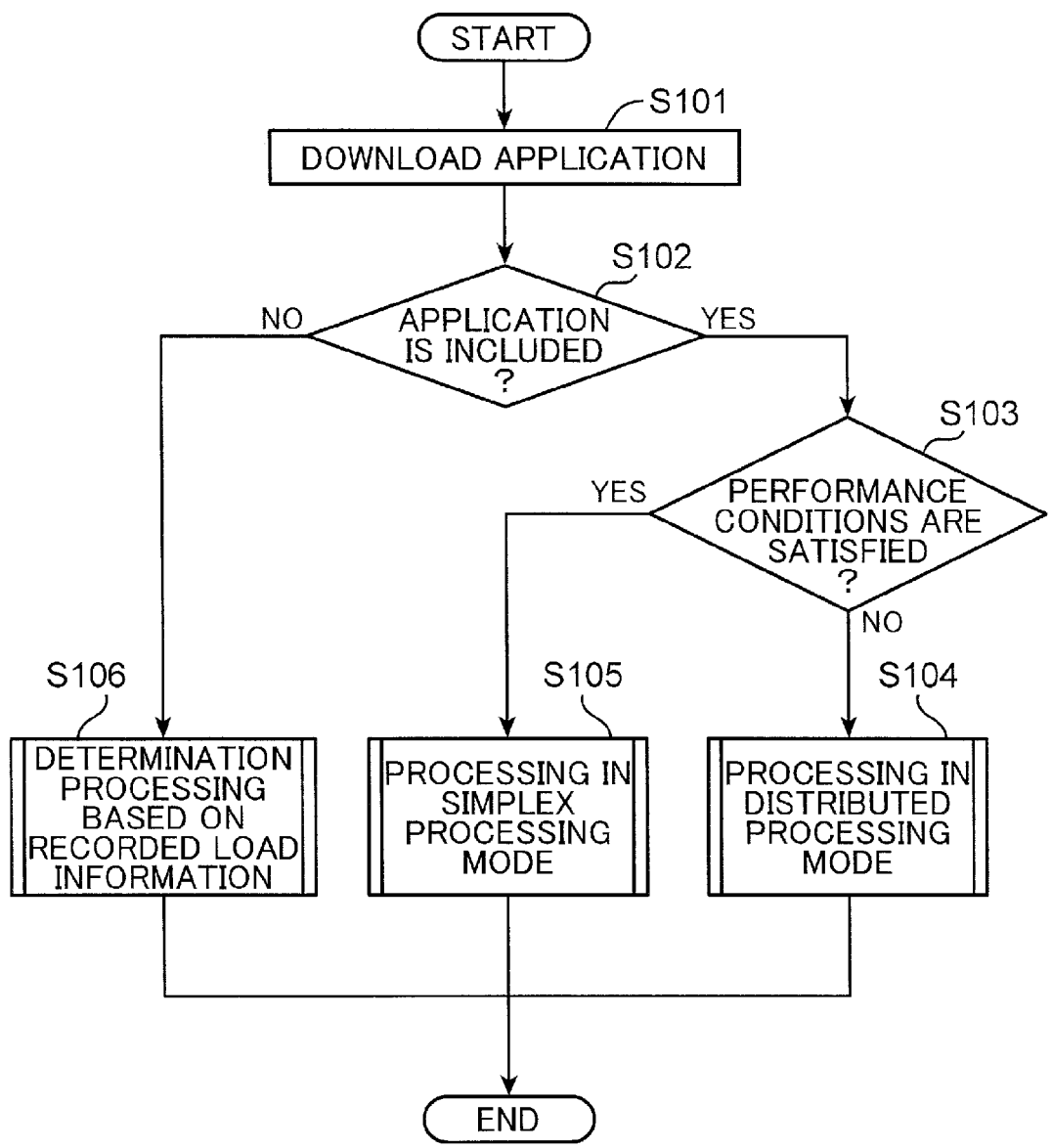
FIG. 6 is a flowchart for explaining an example of processing performed when the client terminal and the server start an application in the first embodiment.

FIG. 6 is a flowchart for explaining an example of processing performed when the client terminal 101 and the server 102 start an application in the first embodiment. First, upon receiving a start request for an application from the client terminal 101, the load determining unit 301 downloads the application from the cloud or the WEB server (S101) and starts determination processing for determining whether the application is an application with a high load for the client terminal 101.

In the client terminal 101, when the operation unit 319 receives user operation for starting an application from the user, the notifying unit 316 transmits a request for the start to the load determining unit 301. Consequently, the load determining unit 301 receives the start request. The load determining unit 301 only has to access a URL of the application included in the start request and download the application.

Subsequently, the load determining unit 301 determines whether application information is included in the application (step S102). If application information is included (YES in S102), the load determining unit 301 receives terminal information from the notifying unit 316 and determines whether performance information satisfies performance conditions included in the application information (step S103).

If the performance information satisfies the performance conditions (YES in S103), the load determining unit 301 transmits a switching notification for switching the execution system to the simplex processing mode to the mode switching unit 312 via the switching notifying unit 302. Processing in the simplex processing mode for starting the application in the simplex processing mode is executed (step S105).

On the other hand, if the performance information does not satisfy the performance conditions (NO in S103), the load determining unit 301 transmits a switching notification for switching the execution system to the distributed processing mode to the mode switching unit 312 via the switching notifying unit 302. Processing in the distributed processing mode for starting the application in the distributed processing mode is executed (step S104).

On the other hand, if application information is not included in the application in S102 (NO in S102), determination processing based on application information cannot be performed. Therefore, the load determining unit 301 refers to the memory 317 and performs determination processing based on recorded load information recorded in the memory 317 (S106).

Figure 7:
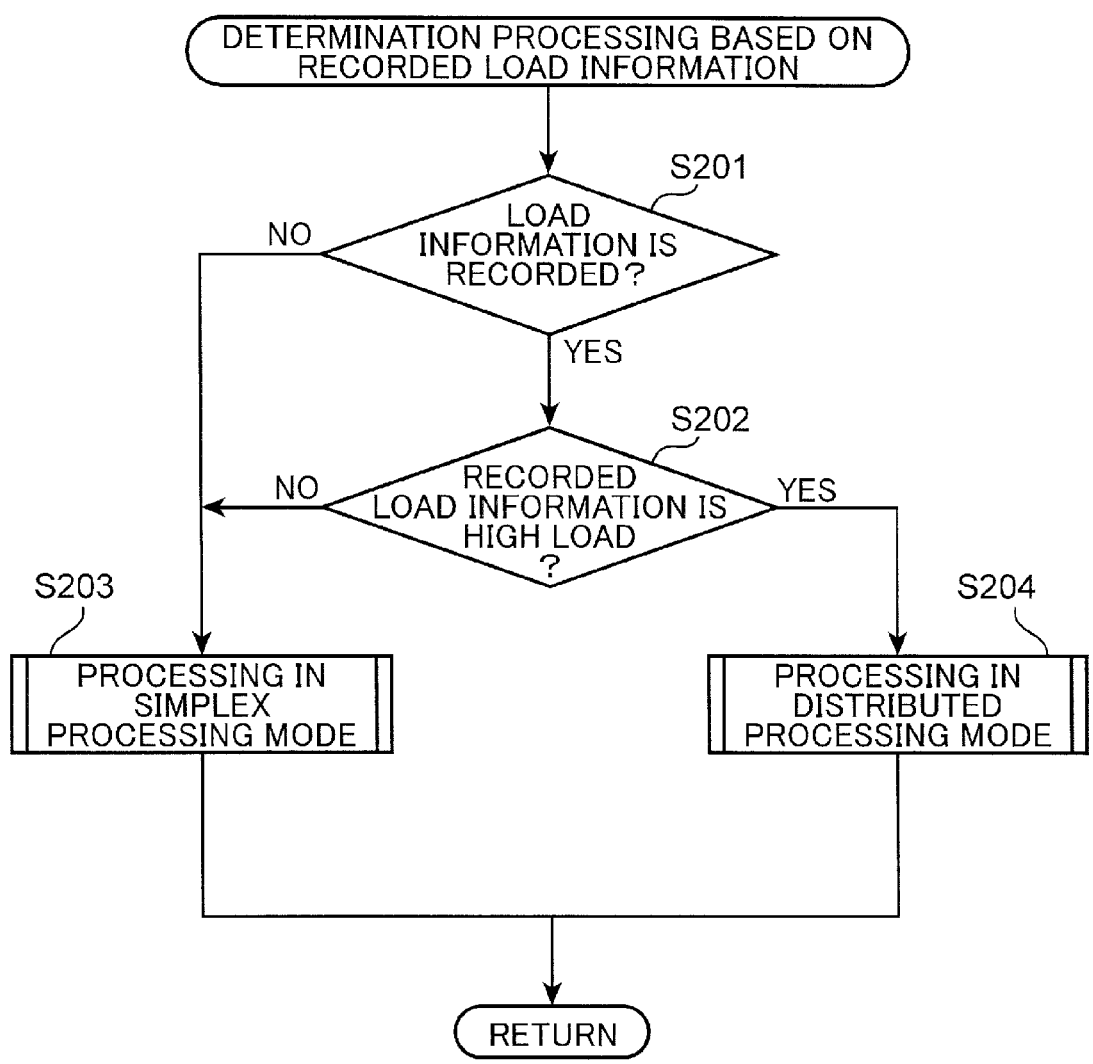
FIG. 7 is a flowchart for explaining an example of determination processing based on recorded load information.

FIG. 7 is a flowchart for explaining an example of the determination processing based on recorded load information. First, the load determining unit 301 refers to the memory 317 and determines whether load information of an execution target application is recorded (S201).

FIG. 8 is a diagram showing an example of a data configuration of recorded load information in which load information stored in the memory 317 is collected. The recorded load information includes columns of an application ID, a CPU use ratio, a memory consumption amount, and a frame rate. The application ID is an identifier for uniquely identifying an application. The CPU use ratio indicates a maximum value of a CPU use ratio at the time when the client terminal 101 executes a relevant application last time. The memory consumption amount indicates a maximum value of a memory consumption amount at the time when the client terminal 101 executes the relevant application last time. The frame rate indicates a minimum value of a frame rate at the time when the client terminal 101 executes the relevant application last time.

If application information is included in the relevant application, an ID described in the application information (in the example shown in FIG. 8, a symbol string described after "appid:") is recorded in the recorded load information as an application ID. On the other hand, if application information is not included in the relevant application, a URL (in the example shown in FIG. 8, a symbol string described after "url:") is recorded in the recorded load information as an application ID.

Therefore, if application information is included in the relevant application, the load determining unit 301 only has to determine YES in S201 if an ID same as the ID described in the application information is recorded in the recorded load information. On the other hand, if application information is not included in the relevant application, the load determining unit 301 only has to determine YES in S201 if a URL same as the URL of the application is recorded in the recorded load information.

Referring back to FIG. 7, the load determining unit 301 determines from load information of the execution target application described in the recorded load information whether the application is an application with a high load for the client terminal 101 (S202). If the load information of the execution target application described in the recorded load information exceeds the specified values, the load determining unit 301 determines that the application is an application with a high load (YES in S202). On the other hand, if the load information of the execution target application recorded in the recorded load information does not exceed the specified values, the load determining unit 301 determines that the application is an application with a low load (NO in S202).

For example, if it is assumed that the specified value of the CPU use ratio is 85%, the load determining unit 301 determines that the load is high if a numerical value equal to or larger than 85% is described in the recorded load information as a CPU use ratio of the execution target application.

If it is assumed that the specified value of the memory consumption amount is 85%, the load determining unit 301 determines that the load is high if a numerical value equal to or larger than 85% is described in the recorded load information as a memory consumption amount of the execution target application.

If the frame rate is 60 fps, the client terminal 101 can extremely smoothly render an image. On the other hand, if the frame rate is several fps, the client terminal 101 is slow in screen update and cannot smoothly render an image. For example, if it is assumed that the specified value of the frame rate is 5 fps, the load determining unit 301 determines that the load is high if a numerical value equal to or smaller than 5% is described in the recorded load information as the frame rate of the execution target application.

In the example shown in FIG. 8, worst values of the CPU use ratio, the memory consumption amount, and the frame rate are recorded. The load determining unit 301 determines from the worst values whether the load is high. However, this is only an example. For example, average values of the CPU use ratio, the memory consumption amount, and the frame rate may be recorded in the recorded load information. In this case, the load determining unit 301 only has to perform determination professing using the average values as information for making a decision.

For example, in some case, the worst values exceed the specified values but the average values are sufficiently smaller than the specified values. In this case, the application is in a high-load state only in a short section during the execution of the application. If a user can allow a load to be temporarily high, the simplex processing mode may be set.

Therefore, if the worst values exceed the specified values but the average values are lower than the specified values by fixed values or more, the load determining unit 301 causes the client terminal 101 to display an inquiry image for inquiring the user whether the simplex processing mode may be set, although a load becomes temporarily high. When the user performs user operation for agreeing to the inquiry, the load determining unit 301 only has to transmit a switching notification for switching the execution system to the simplex processing mode to the mode switching unit 312 via the switching notifying unit 302. A signal indicating user operation concerning whether the user agrees to the inquiry is transmitted, for example, from the notifying unit 316 to the load determining unit 301.

Referring back to FIG. 7, if the determination in S202 is NO, the processing in the simplex processing mode is executed (S203). If the determination in S202 is YES, the processing in the distributed processing mode is executed (S204).

In this way, according to the flowchart of FIG. 7, if load information of the execution target application is not recorded in the memory 317 or if the load information does not exceed the specified values even if load information of the execution target application is recorded in the memory 317, the processing in the simplex processing mode is executed. On the other hand, if the load information recorded in the memory 317 exceeds the specified values, the processing in the distributed processing mode is executed.

Figure 9:
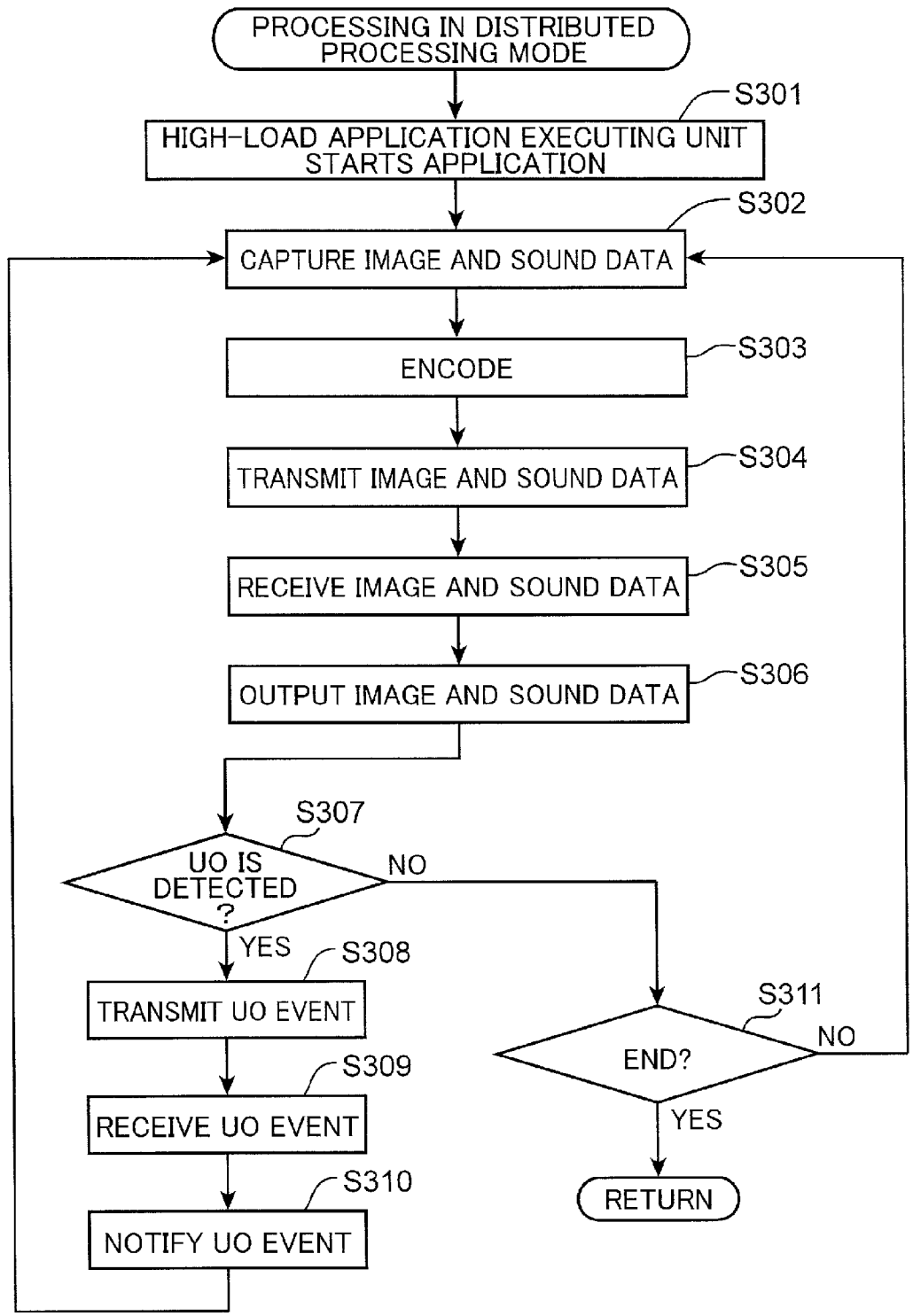
FIG. 9 is a flowchart for explaining an example of processing in the distributed processing mode.

FIG. 9 is a flowchart for explaining an example of the processing in the distributed processing mode. First, the load determining unit 301 loads an execution target application to the high-load application executing unit 304 and causes the high-load application executing unit 304 to start the application (S301).

Subsequently, the screen capture 305 captures, in the encode buffer (not shown in the figures), image data written in the graphic memory (not shown in the figures) by the application. The sound recorder 306 captures, in the encoder buffer (not shown in the figures), sound written in the sound memory by the application (S302).

Subsequently, the encoder 307 encodes the image data and the sound data captured in the encode buffer (not shown in the figures) (S303). Consequently, the image data and the sound data are compressed to be capable of being transmitted at a transmissible bit rate on the network.

Subsequently, the image distributing unit 308 transmits the compressed image data and the compressed sound data to the client terminal 101 via the network (S304).

The client terminal 101 receives, in the image receiving unit 314, the image data and the sound data transmitted from the image distributing unit 308 (S305) and decodes the received image data and the received sound data. Subsequently, the image display unit 315 displays the decoded image data on the display unit 318 and outputs the decoded sound data to the speaker (S306).

Subsequently, some user operation is performed by the user who views an image displayed on the display unit 318. If the UO event distributing unit 313 detects the user operation as a UO event (YES in S307), the UO event is transmitted to the server 102 (S308). On the other hand, if a UO event is not detected (NO in S307), the processing is advanced to S311.

Subsequently, the UO event receiving unit 309 of the server 102 receives the UO event distributed from the UO event distributing unit 313 (S309) and notifies the high-load application executing unit 304 of the UO event. Consequently, the UO event is notified to the application presently being executed (S310).

The application performs operation corresponding to the notified UO event and performs processing for, for example, rendering a new image or outputting click sound.

The processing is returned to S302. The processing in S302 to S306 is executed on image data and sound data generated anew by the application. The image data and the sound data are output to the display unit 318 and the speaker.

Even if a UO event is not detected in step S307 (NO in S307), if the high-load application executing unit 304 does not detect the end of the application (NO in S311), the processing is returned to S302. The processing for the image data and the sound data generated anew by the application is continued.

For example, if the application is an application for viewing a moving image, user operation is hardly detected. However, update of the image data and the sound data is continuously performed. Therefore, the processing in S302 to S306 is continuously executed until the application ends.

On the other hand, if the high-load application executing unit 304 detects the end of the application in S311 (YES in S311), the processing is ended.

Figure 10:
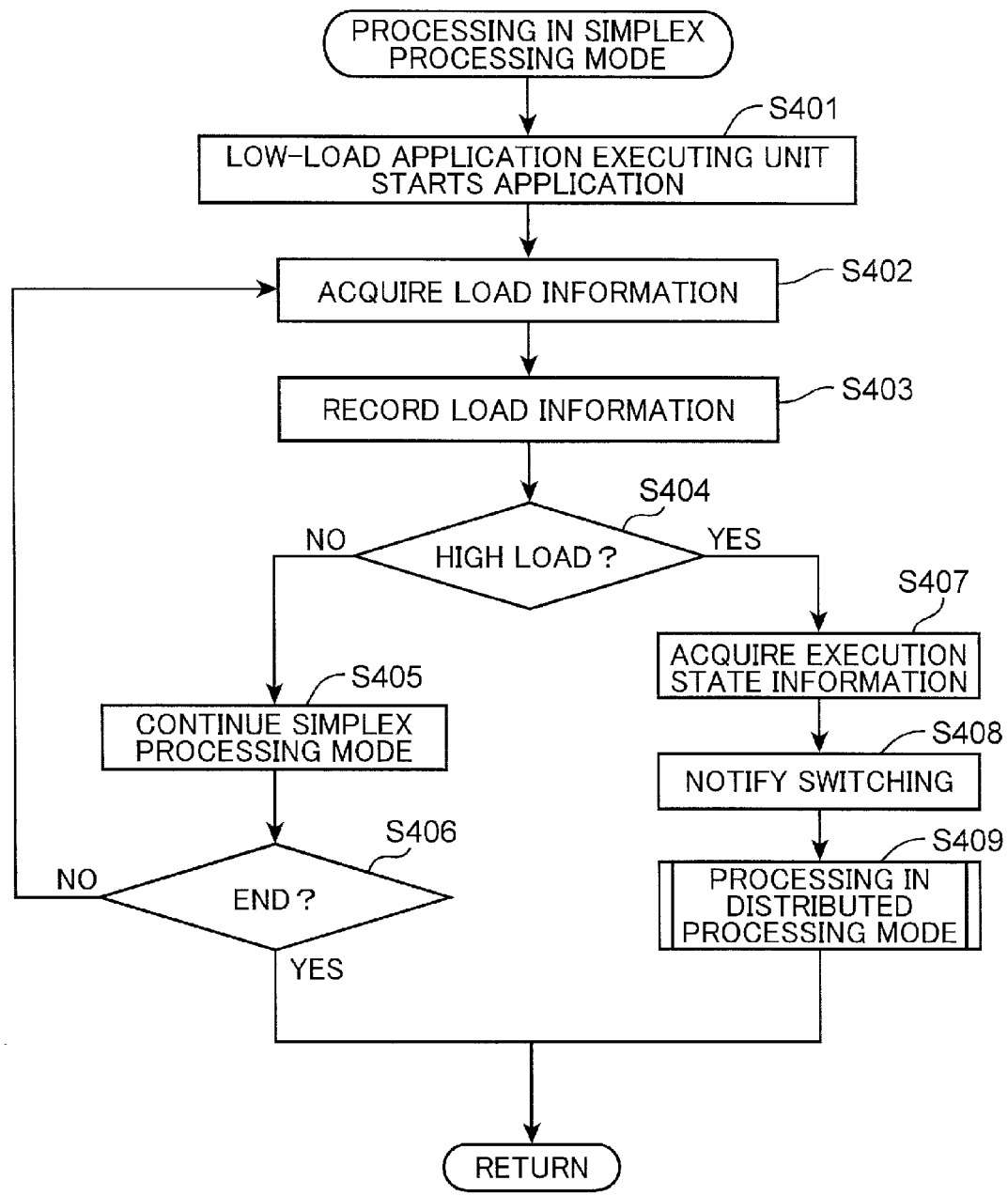
FIG. 10 is a flowchart for explaining an example of the simplex processing mode.

FIG. 10 is a flowchart for explaining an example of the processing in the simplex processing mode. First, an execution target application is loaded to the low-load application executing unit 310 from the load determining unit 301. The low-load application executing unit 310 starts the application (S401).

Subsequently, the load determining unit 301 acquires load information from the notifying unit 316 (S402). When the application is started in the simplex processing mode, the notifying unit 316 periodically transmits the load information to the load determining unit 301. Consequently, the load determining unit 301 can monitor the load of the client terminal 101.

Subsequently, the load determining unit 301 records the acquired load information in the memory 317 (S403). Consequently, load information such as a CPU use ratio, a memory consumption amount, and a frame rate is written in the recorded load information shown in FIG. 8.

Subsequently, the load determining unit 301 determines, according to whether the load information exceeds the specified values, whether the present load of the client terminal 101 is high (S404). If the load information does not exceed the specified values, the load determining unit 301 determines that the load is low (NO in S404) and continues the simplex processing mode (S405).

Subsequently, if the low-load application executing unit 310 does not detect the end of the application (NO in S406), the processing is returned to S402, the processing in S402 and subsequent steps are repeatedly executed, and the load of the client terminal 101 is monitored.

On the other hand, in step S404, if the load information exceeds the specified values, the load determining unit 301 determines that the load is high (YES in S404). The high-load application executing unit 304 acquires execution state information indicating the present execution state of the application from the low-load application executing unit 310 (S407).

Consequently, the high-load application executing unit 304 can take over the present state of the application. As a result, even if the execution system is switched from the simplex processing mode to the distributed processing mode, an execution state of the application is not reset. The processing can be started halfway.

Subsequently, the load determining unit 301 transmits a switching notification for switching the execution system to the distributed processing mode to the mode switching unit 312 via the switching notifying unit 302 (S408).

Subsequently, upon receiving the switching notification for switching the execution system to the distributed processing mode from the switching notifying unit 302 of the server 102, the mode switching unit 312 causes the low-load application executing unit 310 to stop the execution of the application and starts the distributed display processing unit 311. Consequently, the client terminal 101 starts the processing in the distributed processing mode (S409).

Figure 11:
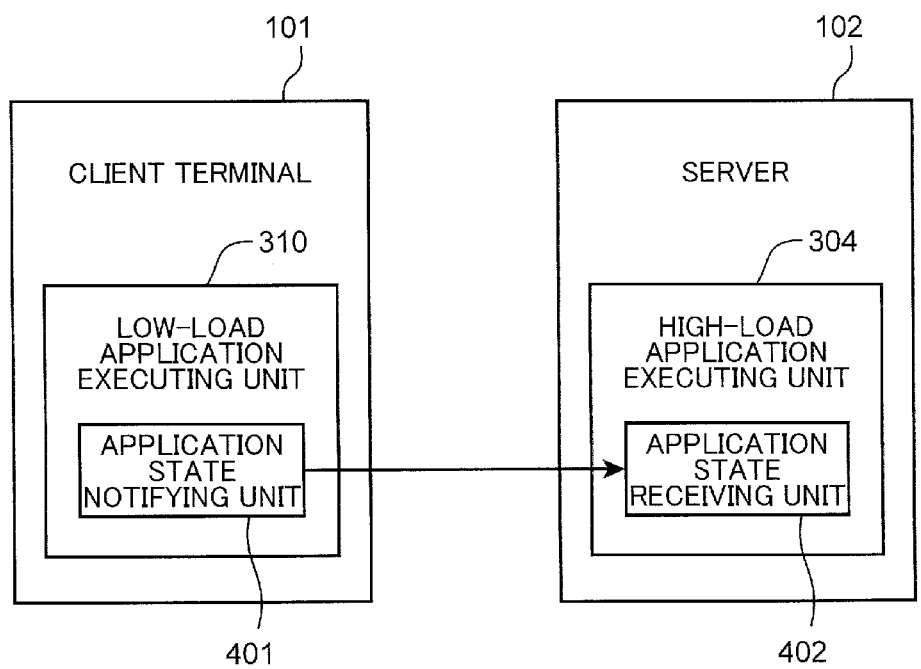
FIG. 11 is a diagram showing a transfer of an execution state of an application executed between the client terminal and the server.

FIG. 11 is a diagram showing a transfer of an execution state of an application executed between the client terminal 101 and the server 102. The transfer of the execution state is executed between the low-load application executing unit 310 and the high-load application executing unit 304.

The low-load application executing unit 310 includes an application state notifying unit 401. The high-load application executing unit 304 includes an application state receiving unit 402.

The application state notifying unit 401 transmits execution state information indicating the present execution state of the application to the application state receiving unit 402. The application state receiving unit 402 receives execution state information transmitted from the application state notifying unit 401. Consequently, the present execution state of the application in the client terminal 101 is transferred to the server 102.

Figure 12:
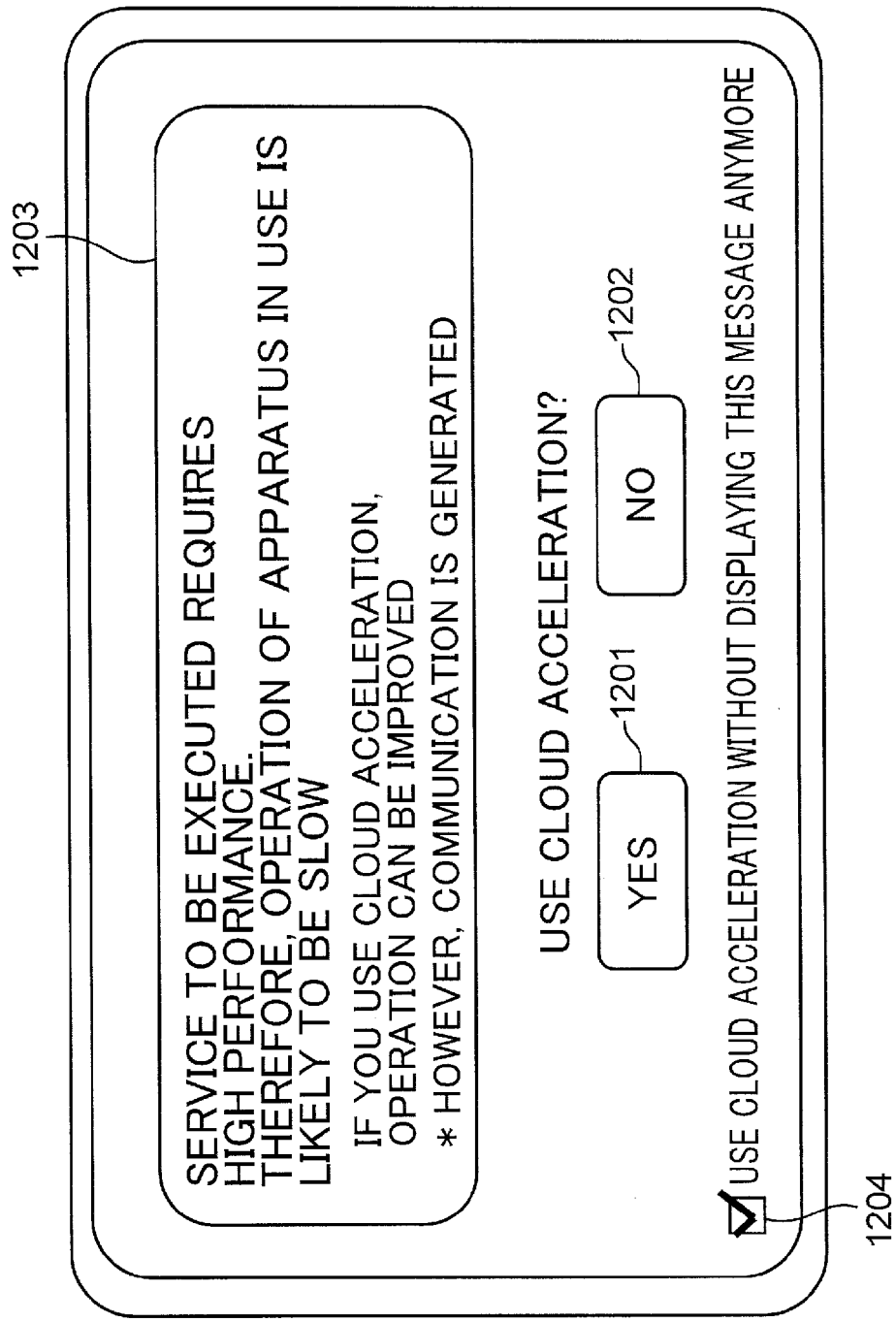
FIG. 12 is a diagram showing an example of a message image notified to a user when an execution system is switched to the distributed processing mode during the execution of the simplex processing mode.

FIG. 12 is a diagram showing an example of a message image notified to the user when the execution system is switched to the distributed processing mode during the execution of the simplex processing mode. In the distributed processing mode, the client terminal 101 is always in a connected state to the server 102. Therefore, a data amount of communication increases compared with the simplex processing mode. If the switching from the simplex processing mode to the distributed processing mode is automatically performed without notifying the user of anything, the user cannot recognize that communication is generated between the client terminal 101 and the server 102. In this case, it is likely that the user considers that communication is not generated between the client terminal 101 and the server 102 and causes the application to operate for a long time.

However, a large amount of data is transmitted and received between the client terminal 101 and the server 102. Depending on contents of an agreement between a communication provider and the user, the user is charged unexpected communication expenses. Therefore, in this embodiment, when the execution system is switched to the distributed processing mode during the start of the simplex processing mode, the message image shown in FIG. 12 is displayed on the client terminal 101 to notify the user that communication is generated.

Specifically, the load determining unit 301 of the server 102 notifies, via the switching notifying unit 302, the mode switching unit 312 of an inquiry request for inquiring the user about necessity of switching to the distributed processing mode. The mode switching unit 312 displays the message image shown in FIG. 12 on the display unit 318.

On the message image shown in FIG. 12, "Use cloud acceleration?" is described. The cloud acceleration is equivalent to the distributed processing mode. In an explanation field 1203 on the upper side of the message image shown in FIG. 12, it is described that, if the cloud acceleration is used, operation is improved but communication is generated. Consequently, when the operation of the application is improved, the user can recognize that communication with the server 102 is generated.

In FIG. 12, a button 1201 with "YES" thereon and a button 1202 with "NO" thereon are displayed. If the user desired to improve the operation even if the communication with the server 102 is generated, the user selects the button 1201. On the other hand, if the user does not desire generation of communication with the server 102, the user selects the button 1202.

If the user selects the button 1201 and the operation unit 319 receives the selection operation, the mode switching unit 312 transmits an approval notification indicating that the user has approved the switching to the distributed processing mode to the load determining unit 301 from the low-load application executing unit 310. Consequently, the load determining unit 301 transmits a switching notification for switching the execution system to the distributed processing mode to the mode switching unit 312 via the switching notifying unit 302. The execution system is switched to the distributed processing mode.

On the other hand, if the user selects the button 1202 and the operation unit 319 receives the selection operation, the low-load application executing unit 310 transmits a disapproval notification indicating that the user does not approve the switching to the distributed processing mode to the load determining unit 301 via the low-load application executing unit 310. Consequently, the load determining unit 301 determines that the simplex processing mode may be continued and causes the low-load application executing unit 310 to continuously execute the application.

However, a user who has a fixed price contract with a communication provider does not mind a data amount of communication. Therefore, in the simplex processing mode, if the client terminal 101 is caused to display the message image shown in FIG. 12 every time the load of the client terminal 101 becomes high, the user is bothered.

Therefore, a check box 1204 is provided on the message image shown in FIG. 12. When the user checks the check box 1204, thereafter, the load determining unit 301 selects, according to a selection result of the user at the time of the check of the check box, whether the execution system is switched to the distributed processing mode or the simplex processing mode is continued.

Specifically, it is assumed that the user selects the button 1201 at the time of the check of the check box. In this case, even if the load of a relevant application exceeds the specified value in the simplex processing mode, the load determining unit 301 automatically switches the execution system to the distributed processing mode without displaying the message image. On the other hand, it is assumed that the user selects the button 1202 at the time of the check of the check box. In this case, even if the load of the relevant application exceeds the specified value in the simplex processing mode, the load determining unit 301 continues the simplex processing mode without displaying the message image.

In this way, according to this embodiment, if it is determined that the execution target application is an application with a high load for the client terminal 101, the execution system is switched to the distributed processing mode. Therefore, the application with a high load for the client terminal 101 is prevented from being executed in the client terminal 101. It is possible to smoothly execute the application.

On the other hand, if it is determined that the execution target application is an application with a low load for the client terminal 101, the execution system is switched to the simplex processing mode. Therefore, it is possible to prevent a situation in which the low-load application, which can be sufficiently processed by the client terminal 101, is subjected to the distributed processing and a data amount of communication increases. As a result, it is possible to minimize battery consumption of the client terminal 101 involved in the increase in the data amount of the communication.

(Second Embodiment)

In the first embodiment, it is determined on the server 102 side whether the execution target application an application with a high load for the client terminal 101. However, in a second embodiment, this determination is performed on the client terminal 101 side. In the second embodiment, explanation of similarities to the first embodiment is omitted and only differences are explained.

Figure 13:
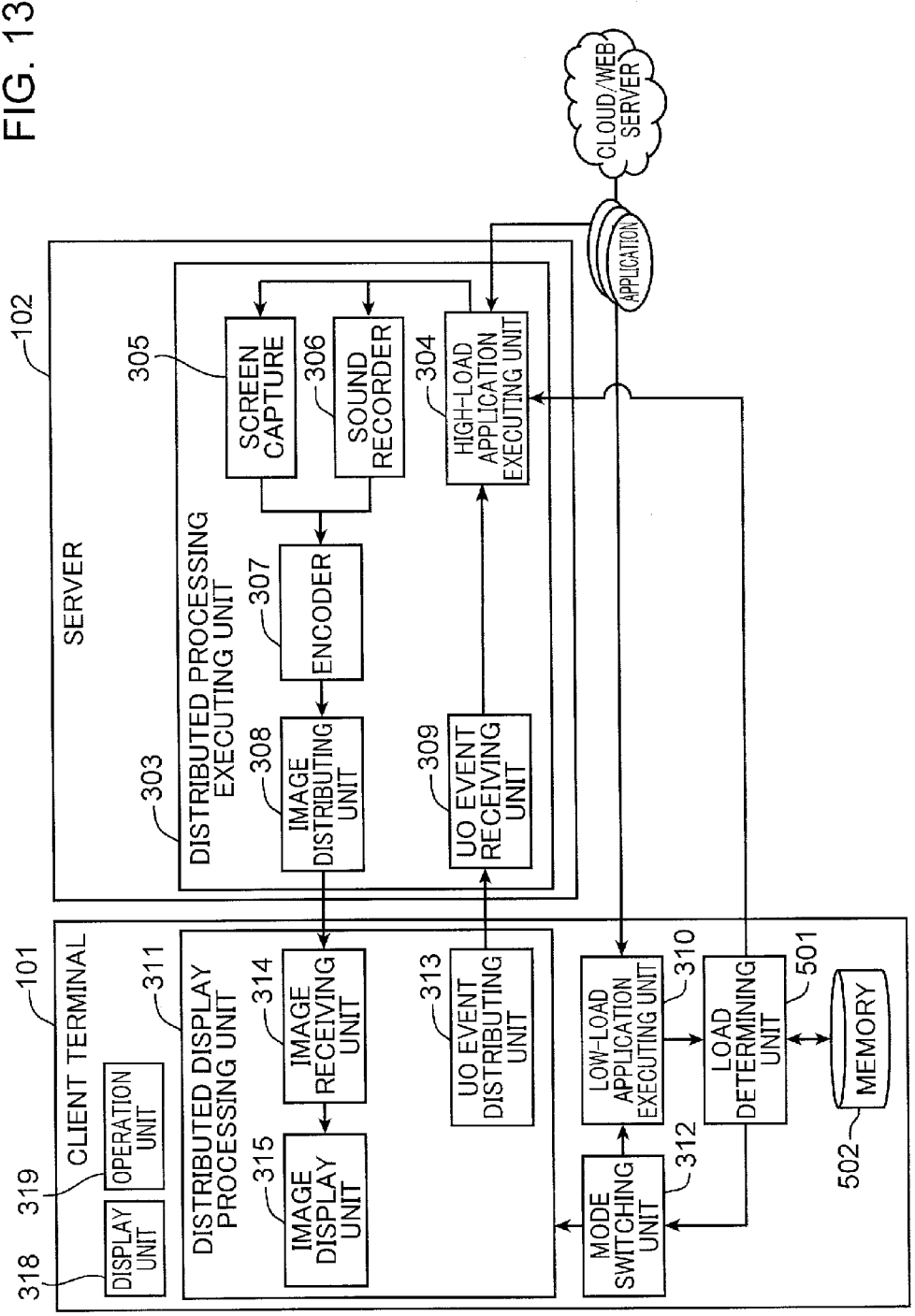
FIG. 13 is a block diagram showing an example of functional configurations of a client terminal and a server in a second embodiment.

FIG. 13 is a block diagram showing an example of functional configurations of the client terminal 101 and the server 102 in the second embodiment. In the second embodiment, the client terminal 101 directly acquires an application from a cloud or a WEB server not through the server 102. In the first embodiment, the load determining unit 301 and the memory 317 are provided in the server 102. However, in the second embodiment, the load determining unit 301 and the memory 317 are provided in the client terminal 101 as a load determining unit 501 and a memory 502. Since the load determining unit 501 is provided on the client terminal 101, the switching notifying unit 302 and the notifying unit 316 are omitted.

As in the first embodiment, the load determining unit 501 determines whether an execution target application is an application with a high load for the client terminal 101 or an application with a low load for the client terminal 101. Determination processing by the load determining unit 501 is basically the same as the determination processing by the load determining unit 301.

However, the load determining unit 501 is provided in the client terminal 101. Therefore, the load determining unit 501 monitors the load of the client terminal 101 at the time when the low-load application executing unit 310 is executing the application and, when determining that the load is high, records, in the memory 502, a URL of the application being executed.

In the memory 502, a list of URLs of applications determined as having high loads is recorded.

Figure 14:
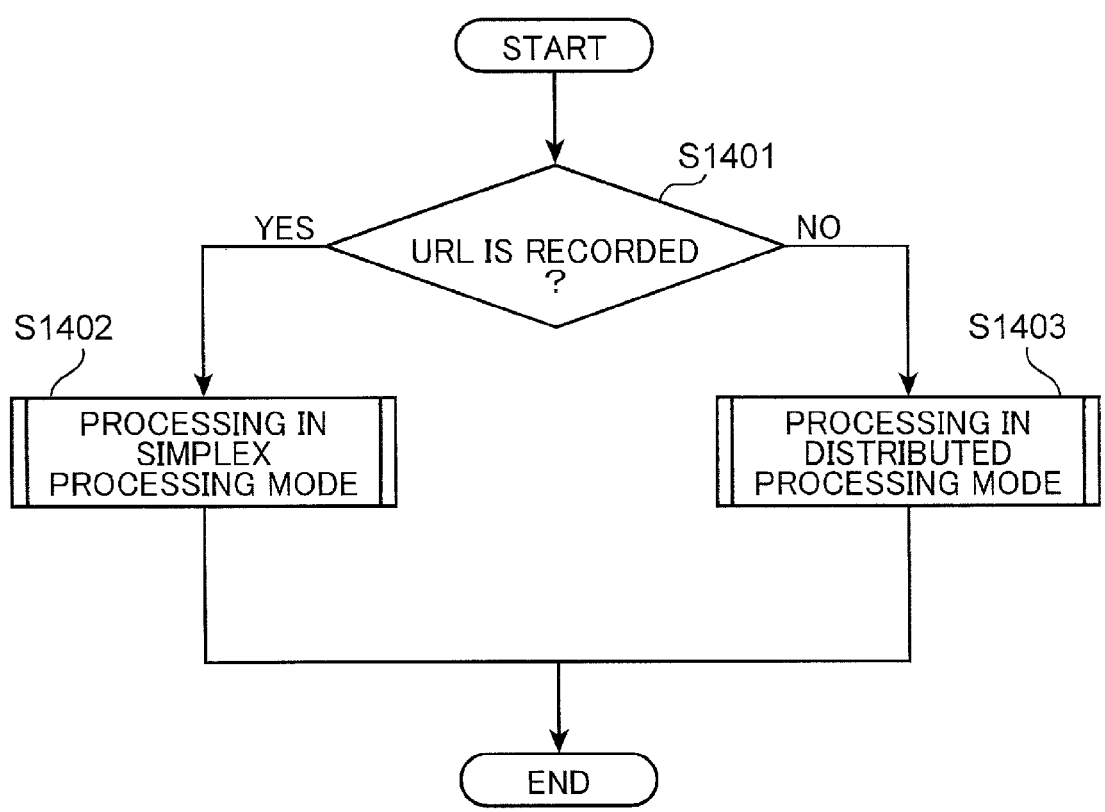
FIG. 14 is a flowchart for explaining an example of processing performed when the client terminal and the server start an application in the second embodiment.

FIG. 14 is a flowchart for explaining an example of processing performed when the client terminal 101 and the server 102 start an application in the second embodiment. First, before acquiring an execution target application, the low-load application executing unit 310 notifies the load determining unit 501 of a URL of the application and causes the load determining unit 501 to determine whether a relevant URL is recorded in the memory 502 (S1401).

If the URL notified from the low-load application executing unit 310 is recorded in the memory 502 (YES in S1401), the load determining unit 501 determines that a relevant application has a low load or is unexecuted. The load determining unit 501 starts the processing in the simplex processing mode (S1402).

On the other hand, if the URL notified from the low-load application executing unit 310 is not recorded in the memory 502 (NO in S1401), the load determining unit 501 determines that the relevant application has a high load. The load determining unit 501 starts the processing in the distributed processing mode (S1403). In this case, the load determining unit 501 transmits the URL notified from the low-load application executing unit 310 to the high-load application executing unit 304 and transmits a switching notification for switching the execution system to the distributed processing mode to the mode switching unit 312. On the other hand, on the server 102 side, the high-load application executing unit 304 accesses the notified URL, acquires the execution target application, and starts the acquired application. In the second embodiment, the processing in the distributed processing mode is the same as the processing in the first embodiment. Therefore, the explanation of the processing is omitted.

Figure 15:
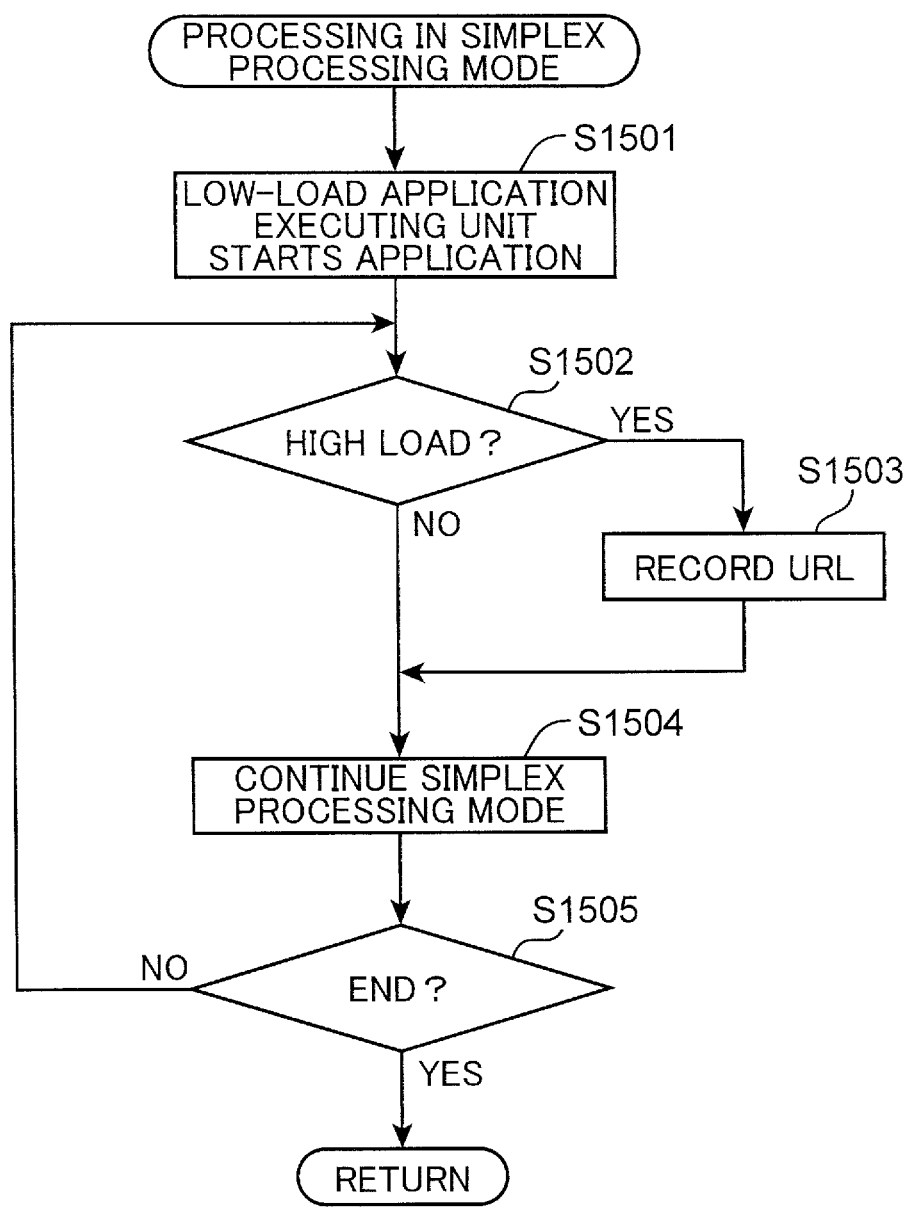
FIG. 15 is a flowchart for explaining an example of processing in the simplex processing mode in the second embodiment.

FIG. 15 is a flowchart for explaining an example of the processing in the simplex processing mode in the second embodiment. First, the low-load application executing unit 310 accesses a URL of an execution target application, acquires the application, and starts the acquired application (S1501).

Subsequently, for example, the load determining unit 501 periodically acquires load information and determines, according to whether the load information exceeds the specified values, whether the present load of the client terminal 101 is high (S1502). The load determining unit 501 only has to acquire load information from, for example, the OS of the client terminal 101.

If the load information does not exceeds the specified values, the load determining unit 501 determines that the load is low (NO in S1502) and advances the processing to S1504. On the other hand, if the load information exceeds the specified values, the load determining unit 501 determines that the load is high (YES in S1502), records the URL of the execution target application in the memory 502 (S1503), and advances the processing to S1504.

In S1504, the load determining unit 501 causes the low-load application executing unit 310 to continuously execute the application irrespective of a determination result in S1502. That is, even if the client terminal 101 has a high load in step S1502, the execution of the application in the simplex processing mode is continued. However, since the URL of the high-load application is recorded in the memory 502 in S1503, when a relevant application is started next time, the load determining unit 501 starts the relevant application in the distributed processing mode according to the processing in S1401.

Subsequently, if the low-load application executing unit 310 does not detect the end of the application (NO in S1505), the processing is returned to S1502. The load of the client terminal 101 is continuously monitored again. On the other hand, if the low-load application executing unit 310 detects the end of the application (YES in S1505), the processing is ended.

In the flowchart of FIG. 15, a form is adopted in which, in the simplex processing mode, if the load of the client terminal 101 becomes high, the client terminal 101 is started in the distributed processing mode during the next start. However, a form for shifting to the distributed processing mode during the present start may be adopted. This form is explained below.

Figure 16:
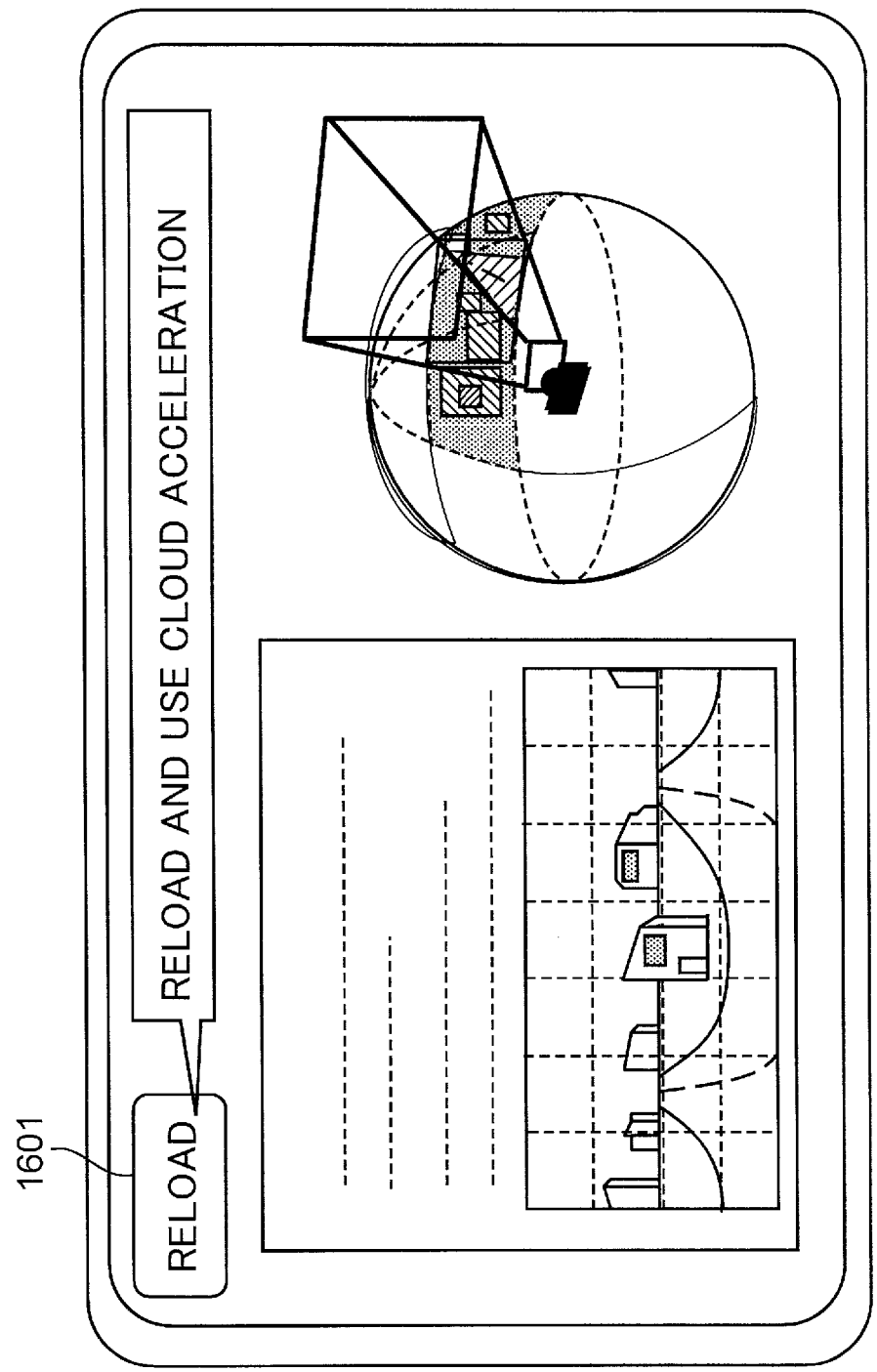
FIG. 16 is a diagram showing an example of a notification image for notifying a user that the load of the client terminal becomes high during the execution of the simplex processing mode in the second embodiment.

FIG. 16 is a diagram showing an example of a notification image for notifying a user that the load of the client terminal 101 becomes high during the execution of the simplex processing mode in the second embodiment.

In the simplex processing mode, if the load of the client terminal 101 becomes high during the execution of an application, it is possible to shift to the distributed processing mode if the server 102 reloads the application.

However, if the application is forcibly reloaded, it is likely that a state input halfway is erased. It is anticipated that there is a user who can allow deterioration in the performance of the client terminal 101 due to a high load state. Therefore, it is preferable to leave it to determination of the user whether the application is reloaded.

Therefore in this embodiment, if the load of the client terminal 101 becomes high during the execution of the simplex processing mode, it is notified to the user that it is likely that the speed of the application can be increased if the user displays the notification image shown in FIG. 16 and reloads the application.

In the notification image shown in FIG. 16, a reload button 1601 with "RELOAD" thereon is provided. "Reload and use cloud acceleration" is described on the right side of the reload button 1601. Consequently, the user can recognize that, if the user presses the reload button 1601, the application is reloaded and the processing of the application can be increased in speed.

As a display form of the reload button 1601, it is preferable to adopt, for example, a display form for highlighting the entire region of the reload button 1601 or flashing the reload button 1601. Consequently, it is possible to surely inform the user of the presence of the reload button 1601.

However, some user feels it annoying to reload the application. Therefore, to deal with such a user, a configuration for causing the user to perform in advance setting for automatically reloading the application if the load of the client terminal 101 becomes high in the simplex processing mode may be adopted. In FIG. 16, a button for cancelling reload may be provided to cause the user to select not to reload the application.

Figure 17:
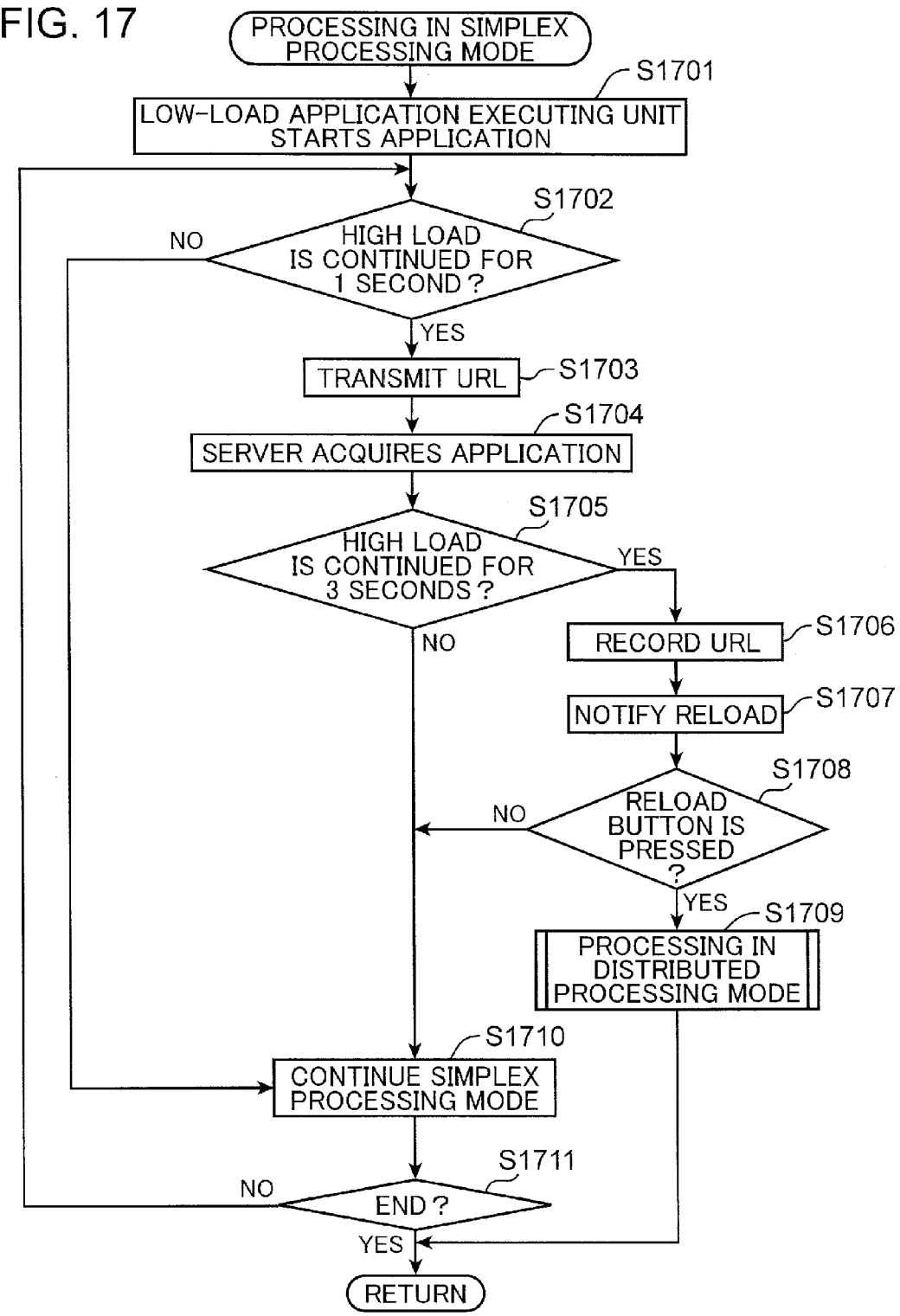
FIG. 17 is a flowchart of a modification of the flowchart of FIG. 15.

FIG. 17 is a flowchart of a modification of the flowchart of FIG. 15. As explained with reference to FIG. 16, if the load of the client terminal 101 becomes high during the execution of the application, it is possible to shift to the distributed processing mode by reloading the application. However, during switching to the distributed processing mode, if the URL of the application is notified to the server 102 and the server 102 is caused to start the processing for acquiring the application, a waiting time until the completion of the acquiring processing occurs.

Therefore, in this embodiment, in the simplex processing mode, if it is highly likely that the application has a high load, the URL is notified to the server 102 and the server 102 is caused to acquire the application in advance. Consequently, it is possible to quickly perform a shift from the simplex processing mode to the distributed processing mode.

First, as in S1501, the low-load application executing unit 310 starts an application (S1701). Subsequently, the load determining unit 501 determines from periodically acquired load information whether a high-load state is continued for one second (an example of a first time) (S1702). The load determining unit 501 only has to determine whether the load is high according to whether the load information exceeds the specified values as explained in the first embodiment.

If the high-load state is continued less than one second (NO in S1702), the load determining unit 501 determines that the application has a low load and continues the simplex processing mode (S1710).

On the other hand, if the high-load state is continued for one minute (YES in S1702), the load determining unit 501 determines that an application being executed is highly likely to be a high-load application and transmits a URL of the application being executed to the server 102 (S1703). Upon receiving the URL, since a shift to the distributed processing mode is likely to occur, the server 102 causes the high-load application executing unit 304 to acquire the application in advance (S1704).

Subsequently, the load determining unit 501 determines whether the high-load state is further continued for two seconds from the determination in S1702 and continued for three second (an example of a second time) in total (S1704). If the high-load state is continued for three seconds (YES in S1705), the load determining unit 501 determines that the application being executed has a high load. The load determining unit 501 records the URL of the application being executed in the memory 502 (S1706).

Subsequently, the low-load application executing unit 310 notifies the user that the application is increased in speed by being reloaded (S1707). In this case, the low-load application executing unit 310 displays the notification image shown in FIG. 16 on the display unit 318. The user inputs operation for pressing the reload button 1601 (YES in S1708). When the operation unit 319 receives the operation, the low-load application executing unit 310 transmits a notification of switching to the distributed processing mode to the mode switching unit 312. Consequently, the processing in the distributed processing mode is started (S1709).

As shown in step S1704, if the application being executed is highly likely to have a high load, the server 102 has acquired the application in advance. Therefore, if the user presses the reload button 1061 in S1708, the server 102 does not need to perform processing for acquiring the application. Therefore, it is possible to reduce time required for the switching to the distributed processing mode by time for the processing.

On the other hand, if the user does not perform the operation for pressing the reload button 1601 (NO in S1708) and the operation unit 319 does not receive the operation, the simplex processing mode is continued (S1710).

If the low-load application executing unit 310 detects the end of the application in S1711 (YES in S1711), the low-load application executing unit 310 ends the application. If the low-load application executing unit 310 does not detect the end of the application (NO in S1711), the processing is returned to S1702.

The processing shown in FIG. 17 is also applicable in the configuration in which the load determining unit 301 is provided in the server 102 in the first embodiment.

In the first and second embodiments, the server 102 is provided on the network. However, this is only an example. The server 102 may be provided on a local network. As the local network, a wireless LAN, a wired LAN, or a network in which the wireless LAN and the wired LAN are mixed only has to be adopted.

If the server 102 compresses image data in a format of moving image data configured by data compressed between frames such as H.264, a data amount is small compared with MotionJPEG. In this case, the server 102 may be provided on the Internet.

On the other hand, when the server 102 compresses image data in a format configured by continuous image data, each of frames of which is compressed, such as MotionJPEG, a data amount is large compared H.264. Therefore, it is preferable to provide the server 102 on the local network. When the server 102 is provided on the local network, the server 102 only has to be mounted on a home server.

FIG. 18 is a diagram showing an example of a hardware configuration of a computer that realizes each of the client terminal 101 and the server 102.

The computer includes the input device 1801, the read only memory (ROM) 1802, the central processing unit (CPU) 1803, the random access memory (RAM) 1804, the external storage device 1805, a display device 1806, a recording medium driving device 1807, and the communication device 1808. The blocks are connected to an internal bus. Various data and the like are input and output via the bus. Various kinds of processing are executed under the control by the CPU 1803.

The input device 1801 is configured by a keyboard, a mouse, and the like and used by the user to input various data. In the ROM 1802, a system program such as a basic input/output system (BIOS) is stored. The external storage device 1805 is configured by a hard disk drive or the like. In the external storage device 1805, a predetermined OS (Operating System), a client program for causing the computer to function as the client terminal 101, a server program for causing the computer to function as the server 102, and the like are stored. The CPU 1803 reads out the OS from the external storage device 1805 and controls the operations of the blocks. The RAM 1804 is used as a work area of the CPU 1803 and the like.

The display device 1806 is configured by, for example, a liquid crystal display or an organic EL display. The display device 1806 displays various images under the control by the CPU 1803. The recording medium driving device 1807 is configured by a DVD-ROM drive, a flexible disk drive, or the like.

The client program and the server program are stored in a computer-readable recording medium 1809 such as a DVD-ROM and provided to the user. The user installs the client program or the server program in the computer by causing the recording medium driving device 1807 to read the recording medium 1809. The user may install the client program or the server program in the computer by storing the client program and the server program in a WEB server on the Internet and downloading the client program or the server program from the WEB server.

The communication device 1808 is configured by, for example, a communication device for connecting the computer to a LAN or the Internet. The communication device 1808 transmits and receives data between the computer and other apparatuses via the Internet under the control by the CPU 1803.

The functional blocks of FIGS. 3 and 13 are typically realized as a computer program processed by the cooperation of a processor and an external memory. However, the functional blocks may be realized by an LSI, which is an integrated circuit. The functional blocks may be individually formed as one chip or may be formed as one chip to include a part or all of the functional blocks. The LSI is adopted herein. However, the LSI is sometimes referred to as IC, system LSI, super LSI, or ultra LSI according to a difference in a degree of integration.

A method of integration is not limited to the LSI. The integration may be realized by a dedicated circuit or a general purpose processor. After the LSI is manufactured, a programmable field programmable gate array (FPGA) or a reconfigurable processor capable of reconfiguring connection and setting of circuit cells in the LSI may be used.

Further, if a technique for integration replacing the LSI emerges according to the development of a semiconductor technology or another technology deriving from the semiconductor technology, naturally, the integration of the functional blocks may be performed using the technology.

A part or all of the components included in the client terminal 101 and the server 102 in the embodiment may be configured from one system large scale integration (LSI).

The system LSI is an ultra multifunction LSI manufactured by integrating a plurality of components on one chip. Specifically, the system LSI is a computer system including a microprocessor, a read only memory (ROM), and a random access memory (RAM). A computer program is stored in the ROM. The microprocessor operates according to the computer program, whereby the system LSI attains the function thereof.

The system LSI is adopted herein. However, the system LSI is sometimes also referred to as IC, LSI, super LSI, or ultra LSI according to a difference in a degree of integration. A method of integration is not limited to the LSI. The integration may be realized by a dedicated circuit or a general purpose processor. After the LSI is manufactured, a programmable field programmable gate array (FPGA) or a reconfigurable processor capable of reconfiguring connection and setting of circuit cells in the LSI may be used.

Further, if a technology for integration replacing the LSI emerges according to the development of a semiconductor technology or another technology deriving from the semiconductor technology, naturally, the integration of the functional blocks may be performed using the technology. For example, a biotechnology could be applied as a possibility.

(Summary of the Embodiment)

(1) A client terminal according to this embodiment is a client terminal that executes an application in cooperation with a server communicably connected to the client terminal via a network, the client terminal including: a display unit configured to display image data, which is an execution result of the application; a mode switching unit configured to switch an execution system for the application to a simplex processing mode for causing the client terminal to execute the application and a distributed processing mode for causing the server to execute the application; an application executing unit configured to execute the application in the simplex processing mode; and a distributed display processing unit configured to receive the image data indicating the execution result of the application from the server and display the image data on the display unit in the distributed processing mode, wherein the mode switching unit switches the execution system to the distributed processing mode if the application is an application with a high load for the client terminal.

With this configuration, a high-load application hard to be processed by the client terminal alone is executed on the server side. The client terminal only has to receive and display a processing result of the server. On the other hand, a low-load application that can be sufficiently processed by the client terminal alone is executed by the client terminal alone without being subjected to distributed processing. Therefore, it is possible to cause the application to smoothly operate.

Irrespective of whether the application has a high load or a low load, it is possible to always maintain a load applied to the client terminal in a low state and suppress the power consumption of the client terminal. Further, only when the high-load application is executed, communication is generated between the server and the client terminal. Therefore, a data amount to be communicated is suppressed. It is possible to suppress the power consumption of the client terminal. In particular, when the client terminal is a mobile terminal limited in the capacity of a battery, it is possible to suppress a consumption amount of the battery and use the client terminal for a long time.

Further, cooperated processing with the server is limited to only the high-load application. Therefore, a frequency of the client using the server for the cooperated processing is reduced. It is possible to reduce a load applied to not only the client terminal but also the server.

(2) The client terminal may further include a load determining unit configured to determine whether the application is an application with a high load for the client terminal on the basis of performance information indicating the performance of the client terminal and a performance condition specified by the application and, when determining that the application is the high-load application, transmit a switching notification for switching the execution system to the distributed processing mode to the mode switching unit and, when determining that the application is a low-load application, transmit a switching notification for switching the execution system to the simplex processing mode to the mode switching unit.

With this configuration, if the performance information of the client terminal satisfies a performance condition requested by the application, it is determined that an execution target application has a low load. The application is executed by the client terminal. Therefore, it is possible to accurately determine whether the execution target application has a low load or a high load for the client terminal.

(3) The load determining unit may monitor a load of the client terminal in the simplex processing mode and, if the load exceeds a specified value, transmit a switching notification for switching the execution system to the distributed processing mode to the mode switching unit.

With this configuration, when the client terminal is executing the application, if the load of the client terminal exceeds the specified value, the execution system is switched from the simplex processing mode to the distributed processing mode. Therefore, if it is determined during a start that the application has a low load for the client terminal and the execution system is set to the simplex processing mode but the application has a high load when actually executed, it is possible to switch the execution system to the distributed processing mode. Therefore, it is possible to prevent the application with a high load for the client terminal from being continuously executed by the client terminal.

(4) If time in which the load of the client terminal exceeds the specified value lasts for a predetermined first time in the simplex processing mode, the load determining unit may cause the server to acquire the application in advance and, if the time in which the load exceeds the specified value further lasts for a predetermined second time (longer than the first time), the load determining unit may transmit the switching notification for switching the execution system to the distributed processing mode to the mode switching unit.

With this configuration, if the load of the application is highly likely to be high for the client terminal, the application is acquired by the server in advance. Therefore, if it is actually determined that the load is high and the execution system is switched from the simplex processing mode to the distributed processing mode, the server does not need to perform processing for acquiring the application. It is possible to perform the switching from the simplex processing mode to the distributed processing mode in a short time.

(5) When the load determining unit transmits the switching notification for switching the execution system to the distributed processing mode to the mode switching unit in the simplex processing mode, the load determining unit may inquire a user about necessity of switching to the distributed processing mode and, when the user performs user operation for approving the switching to the distributed processing mode, the load determining unit may transmit the switching notification to the mode switching unit.

With this configuration, it is possible to execute the application in an appropriate execution system according to a demand of a user who allows a decrease in execution speed of the application, a user who dislikes an increase in communication costs, or the like.

(6) If the performance condition is not specified by the application, the load determining unit may transmit a switching notification for switching the execution system to the simplex processing mode to the mode switching unit and, thereafter, monitor a load of the client terminal and, if the load exceeds a specified value, transmit a switching notification for switching the execution system to the distributed processing mode to the mode switching unit.

With this configuration, if the performance condition is not described in the application, the application is started in the simplex processing mode for the time being. Thereafter, if the load of the client terminal becomes high, the execution system is switched from the simplex processing mode to the distributed processing mode. Therefore, even if the performance condition is not described in the application, it is possible to execute the application in an appropriate execution system.

(7) The client terminal may further include a memory configured to record a monitoring result of the load, and the load determining unit may refer to the memory during a start of the application and, if a monitoring result indicating a high load is recorded, determine that the application is a high-load application and transmit the switching notification for switching the execution system to the distributed processing mode to the mode switching unit.

With this configuration, the monitoring result of the load obtained when the client terminal executes the application is stored in the memory. Therefore, when a relevant application is executed next, it is possible to quickly and accurately determine, referring to the monitoring result, whether the application has a high load for the client terminal.

(8) If the monitoring result is not recorded in the memory, the load determining unit may transmit the switching notification for switching the execution system to the simplex processing mode to the mode switching unit and, thereafter, monitor a load of the client terminal and, if the load exceeds the specified value, transmit the switching notification for switching the execution system to the distributed processing mode to the mode switching unit.

With this configuration, when an execution target application is executed for the first time by the client terminal, the application is started in the simplex processing mode for the time being. Thereafter, if the load of the client terminal becomes high, the execution system is switched to the distributed processing mode. Therefore, an application with a high load for the client terminal is prevented from being continuously executed by the client terminal. It is possible to execute the application in an appropriate execution system.

(9) The client terminal may further include an operation unit configured to receive user operation for the application, and the distributed display processing unit may detect the user operation in the distributed processing mode and transmit a UO event indicating content of the detected user operation to the server.

With this configuration, in the distributed processing mode, when the user applies operation to the application, the operation is notified to the server, the server performs processing corresponding to the operation, and an execution result is returned to the client terminal. Therefore, even in the distributed processing mode, it is possible to smoothly execute the application without making the user aware that transmission and reception of data is performed between the client terminal and the server.

(10) A server according to this embodiment is a server that executes an application in cooperation with a client terminal communicably connected to the server via a network, the server including: a server-side application executing unit configured to execute the application in a distributed processing mode; an image distributing unit configured to transmit image data indicating an execution result of the application by the server-side application executing unit to the client terminal; and a load determining unit configured to transmit, when determining that the application is an application with a low load for the client terminal, a switching notification for switching an execution system to a simplex processing mode for causing the client terminal to execute the application, to the client terminal.

With this configuration, it is possible to provide a server for obtaining the effect described in (1).

(11) The load determining unit may determine whether the application is an application with a low load for the client terminal on the basis of performance information indicating the performance of the client terminal and a performance condition specified by the application and, when determining that the application is the low-load application, transmit a switching notification for switching the execution system to the simplex processing mode to the client terminal and, when determining that the application is a high-load application, transmit a switching notification for switching the execution system to the distributed processing mode to the client terminal.

With this configuration, in a configuration in which the load determining unit is provided in the server, an effect same as the effect described in (2) is obtained.

(12) The load determining unit may monitor a load of the client terminal in the simplex processing mode and, if the load exceeds a specified value, transmit a switching notification for switching the execution system to the distributed processing mode to the client terminal.

With this configuration, in the configuration in which the load determining unit is provided in the server, an effect same as the effect described in (3) is obtained.

(13) When the load determining unit transmits the switching notification for switching the execution system to the distributed processing mode to the client terminal in the simplex processing mode, the load determining unit may transmit an inquiry request for inquiring a user about necessity of switching to the distributed processing mode to the client terminal and, when receiving, from the client terminal, an approval notification indicating that the user has approved the switching to the distributed processing mode, transmit the switching notification for switching the execution system to the client terminal.

With this configuration, in the configuration in which the load determining unit is provided in the server, an effect same as the effect described in (5) is obtained.

(14) If the performance condition is not specified by the application, the load determining unit may transmit a switching notification for switching the execution system to the simplex processing mode to the client terminal and, thereafter, monitor a load of the client terminal and, if the load exceeds a specified value, transmit a switching notification for switching the execution system to the distributed processing mode to the client terminal.

With this configuration, in the configuration in which the load determining unit is provided in the server, an effect same as the effect described in (6) is obtained.

(15) The server may further include a memory configured to record a monitoring result of the load, and the load determining unit may refer to the memory during a start of the application and, if a monitoring result indicating a high load is recorded, determine that the application is a high-load application and transmit the switching notification for switching the execution system to the distributed processing mode to the client terminal.

With this configuration, in the configuration in which the load determining unit is provided in the server, an effect same as the effect described in (7) is obtained.

(16) The server may further include: an encoder configured to compress the image data into a format configured by data compressed between frames; and an image distributing unit configured to transmit the image data compressed by the encoder to the client terminal, and the server and the client terminal may be connected via the Internet.

With this configuration, the image data is compressed in the format configured by the data compressed between the frames and transmitted from the server to the client terminal. Therefore, even if the server and the client terminal are connected via the Internet, it is possible to smoothly execute the application.

(17) The server may further include: an encoder configured to compress the image data into a format configured by continuous image data, each of frames of which is compressed; and an image distributing unit configured to transmit the image data compressed by the encoder to the client terminal, and the server and the client terminal may be connected via a local network.

With this configuration, the image data is compressed in the format configured by the continuous image data, each of the frames of which is compressed, and transmitted from the server to the client terminal. The server and the client terminal are connected via the local network. Therefore, it is possible to smoothly execute the application.

This application is based on Japanese Patent application No. 2012-256365 filed in Japan Patent Office on Nov. 22, 2012, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A client terminal that executes an application alone or in cooperation with a server communicably connected to the client terminal via a network, the client terminal comprising:
    a non-transitory memory storing a program; and
    a hardware processor that executes the program, the program when executed causes the client terminal to operate as different units stored in the non-transitory memory including:
    a display unit configured to display image data;
    a mode switching unit configured to switch an execution system for the application to a simplex processing mode for causing the client terminal alone to perform both execution processing and display processing of the image data for the application and a distributed processing mode for causing the server and the client terminal to collaborate with each other to perform the execution processing and the display processing for the application such that the server performs the execution processing and the client terminal performs the display processing of the image data for the application;
    an application executing unit configured to perform execution processing for the application in the simplex processing mode; and
    a distributed display processing unit configured to perform the display processing so as to receive the image data indicating by an execution result of execution processing and display the image data on the display unit, the execution result being provided by either the application executing unit in the simplex processing mode or from the server in the distributed processing mode, wherein
    the mode switching unit switches the execution system to the distributed processing mode if the application is a high load for the client terminal.

2. The client terminal according to claim 1, wherein the hardware processor executes the program, and the program when executed causes the client terminal to further operate as a load determining unit configured to determine whether the application is a high load for the client terminal on the basis of performance information indicating performance of the client terminal and a performance condition specified by the application and, when determining that the application is the high-load application, transmit a switching notification for switching the execution system to the distributed processing mode to the mode switching unit and, when determining that the application is a low-load application, transmit a switching notification for switching the execution system to the simplex processing mode to the mode switching unit.

3. The client terminal according to claim 2, wherein the load determining unit monitors a load of the client terminal in the simplex processing mode and, if the load exceeds a specified value, transmits a switching notification for switching the execution system to the distributed processing mode to the mode switching unit.

4. The client terminal according to claim 3, wherein if time in which the load of the client terminal exceeds the specified value lasts for a predetermined first time in the simplex processing mode, the load determining unit causes the server to acquire the application in advance and, if the time in which the load exceeds the specified value further lasts for a predetermined second time longer than the first time, the load determining unit transmits the switching notification for switching the execution system to the distributed processing mode to the mode switching unit.

5. The client terminal according to claim 3, wherein when the load determining unit transmits the switching notification for switching the execution system to the distributed processing mode to the mode switching unit in the simplex processing mode, the load determining unit inquires a user about necessity of switching to the distributed processing mode and, when the user performs user operation for approving the switching to the distributed processing mode, the load determining unit transmits the switching notification to the mode switching unit.

6. The client terminal according to claim 2, wherein, if the performance condition is not specified by the application, the load determining unit transmits a switching notification for switching the execution system to the simplex processing mode to the mode switching unit and, thereafter, monitors a load of the client terminal and, if the load exceeds a specified value, transmits a switching notification for switching the execution system to the distributed processing mode to the mode switching unit.

7. The client terminal according to claim 6, further comprising a memory configured to record a monitoring result of the load, wherein
    the load determining unit refers to the memory during a start of the application and, if a monitoring result indicating a high load is recorded, determines that the application is a high-load application and transmits the switching notification for switching the execution system to the distributed processing mode to the mode switching unit.

8. The client terminal according to claim 7, wherein, if the monitoring result is not recorded in the memory, the load determining unit transmits the switching notification for switching the execution system to the simplex processing mode to the mode switching unit and, thereafter, monitors a load of the client terminal and, if the load exceeds the specified value, transmits the switching notification for switching the execution system to the distributed processing mode to the mode switching unit.

9. The client terminal according to claim 1, further comprising an operation unit configured to receive user operation for the application, wherein
the distributed display processing unit detects the user operation in the distributed processing mode and transmits a UO event indicating content of the detected user operation to the server.

10. The client terminal according to claim 1, wherein
the mode switching unit causes the application executing unit to stop a execution processing for the application and transmit execution state information indicating a present execution state of the application to the server, when receiving a switching notification for switching the execution system to the distributed processing mode from the server.

11. A server that executes an application in cooperation with a client terminal communicably connected to the server via a network, the server comprising:
a non-transitory memory storing a program; and
a hardware processor that executes the program, the program when executed causes the server to operate as different units stored in the non-transitory memory including:
a server-side application executing unit configured to execute the application in a distributed processing mode for causing the server and the client terminal to collaborate with each other to perform execution processing and display processing of image data for the application such that the server performs the execution processing and the client terminal performs the display processing of the image data for the application;
an image distributing unit configured to transmit the image data indicating an execution result of the execution processing for the application by the server-side application executing unit to the client terminal; and
a load determining unit configured to transmit, when determining that the application is a low load for the client terminal, a switching notification for switching an execution system to a simplex processing mode for causing the client terminal alone to perform both execution processing and display processing of the image data for the application, to the client terminal.

12. The server according to claim 11, wherein, the load determining unit determines whether the application is a low load for the client terminal on the basis of performance information indicating performance of the client terminal and a performance condition specified by the application and, when determining that the application is the low-load application, transmits a switching notification for switching the execution system to the simplex processing mode to the client terminal and, when determining that the application is a high-load application, transmits a switching notification for switching the execution system to the distributed processing mode to the client terminal.

13. The server according to claim 12, wherein the load determining unit monitors a load of the client terminal in the simplex processing mode and, if the load exceeds a specified value, transmits a switching notification for switching the execution system to the distributed processing mode to the client terminal.

14. The server according to claim 12, wherein when the load determining unit transmits the switching notification for switching the execution system to the distributed processing mode to the client terminal in the simplex processing mode, the load determining unit transmits an inquiry request for inquiring a user about necessity of switching to the distributed processing mode to the client terminal and, when receiving, from the client terminal, an approval notification indicating that the user has approved the switching to the distributed processing mode, transmits the switching notification to the client terminal.

15. The server according to claim 12, wherein, if the performance condition is not specified by the application, the load determining unit transmits a switching notification for switching the execution system to the simplex processing mode to the client terminal and, thereafter, monitors a load of the client terminal and, if the load exceeds a specified value, transmits a switching notification for switching the execution system to the distributed processing mode to the client terminal.

16. The server according to claim 15, wherein the server is configured to record a monitoring result of the load, wherein
the load determining unit refers to the memory during a start of the application and, if a monitoring result indicating a high load is recorded, determines that the application is a high-load application and transmits the switching notification for switching the execution system to the distributed processing mode to the client terminal.

17. The server according to claim 11, further comprising:
an encoder configured to compress the image data into a format configured by data compressed between frames; and
an image distributing unit configured to transmit the image data compressed by the encoder to the client terminal, wherein
the server and the client terminal are connected via the Internet.

18. The server according to claim 11, further comprising:
an encoder configured to compress the image data into a format configured by continuous image data, each of frames of which is compressed; and
an image distributing unit configured to transmit the image data compressed by the encoder to the client terminal, wherein
the server and the client terminal are connected via a local network.

19. A distributed processing method by a server that executes an application in cooperation with a client terminal communicably connected to the server via a network, the distributed processing method comprising:
a server-side application executing step of executing the application in a distributed processing mode for causing the server and the client terminal to collaborate with each other to perform execution processing and display processing of image data for the application such that the server performs the execution processing and the client terminal performs the display processing of the image data for the application;
an image distributing step of transmitting the image data indicating an execution result of the execution processing for the application by the server-side application executing step to the client terminal; and
a load determining step of transmitting, when determining that the application is a low load for the client terminal, a switching notification for switching an execution system to a simplex processing mode for causing the client terminal alone to perform both execution processing and display processing of the image data for the application, to the client terminal.

* * * * *